(12) United States Patent
Wang et al.

(10) Patent No.: US 11,634,549 B2
(45) Date of Patent: Apr. 25, 2023

(54) METHOD OF FABRICATING PATTERNED CELLULOSE NANOCRYSTAL COMPOSITE NANOFIBERS AND NANO THIN FILMS AND THEIR APPLICATIONS

(71) Applicant: National Tsinghua University, Hsinchu (TW)

(72) Inventors: Wei-Chih Wang, Hsinchu (TW); Yen-Tse Cheng, Hsinchu (TW)

(73) Assignee: National Tsinghua University, Hsinchu (TW)

( * ) Notice: Subject to any disclaimer, the term of this patent is extended or adjusted under 35 U.S.C. 154(b) by 0 days.

(21) Appl. No.: 17/679,411

(22) Filed: Feb. 24, 2022

(65) Prior Publication Data

US 2022/0177660 A1    Jun. 9, 2022

Related U.S. Application Data

(62) Division of application No. 16/411,200, filed on May 14, 2019, now Pat. No. 11,312,828.

(51) Int. Cl.
B05D 5/00 (2006.01)
C08J 5/22 (2006.01)
C08J 5/18 (2006.01)
B05D 1/00 (2006.01)

(52) U.S. Cl.
CPC ............... *C08J 5/22* (2013.01); *B05D 1/005* (2013.01); *C08J 5/18* (2013.01); *C08J 2301/02* (2013.01)

(58) Field of Classification Search
CPC .................................................. B05D 1/005
See application file for complete search history.

*Primary Examiner* — Austin Murata
(74) *Attorney, Agent, or Firm* — Lin & Associates Intellectual Property, Inc.

(57) ABSTRACT

The present invention provides a method for fabricating patterned cellulose nanocrystal (CNC) composite nanofibers and thin films for optical and electromagnetic sensor and actuator application, comprising the following steps of: selecting materials for fabricating patterned cellulose nanocrystal (CNC) composite nanofibers; and fabricating patterned CNCs composite nanofibers by incorporating secondary phases either during electrospinning or post-processing, wherein the secondary phases may include dielectrics, electrically or magnetically activated nanoparticles or polymers and biological cells mechanically reinforced by CNCs.

20 Claims, 28 Drawing Sheets

METHOD OF FABRICATING PATTERNED CELLULOSE NANOCRYSTAL COMPOSITE NANOFIBERS AND NANO THIN FILMS AND THEIR APPLICATIONS

CROSS-REFERENCE TO RELATED APPLICATION

This is a division of U.S. patent application Ser. No. 16/411,200, filed May 14, 2019, which is incorporated herewith by reference in its entirety.

BACKGROUND OF THE INVENTION

1. Field of the Invention

The presented disclosure describes a method for fabricating patterned cellulose nanocrystal (CNC) composite nanofibers and thin films for optical and electromagnetic sensor and actuator application.

2. The Prior Arts

Cellulose is renewable, biodegradable, and one of the most abundant materials on earth. Cellulose is mainly produced in wood and plants such as hemp, flax, jute, ramie and cotton. It is also synthesized by algae, tunicates and bacteria. Other abundant and largely unused sources of cellulose are agricultural residues (wastes and by-products), which are obtained at a low cost from a large variety of natural and renewable materials. The Cellulose molecule consists of Beta-1 with 4-D-linked glucose chains of molecular formula $(C_6H_{10}O_5)_n$, where n ranges from 10,000 to 15,000. These chains are linked through an acetal oxygen, covalently bonding C1 of one glucose ring and C4 of the adjoining ring.

Cellulose was first discovered in 1838 and since then has been used extensively as a natural polymer in many applications. In 1920 X-ray diffraction helped determine that cellulose was composed of crystalline domains, leading to much work isolating only these crystalline segments. It was found that cellulose has 4 different crystal structures, i.e., types I-IV. Only types I and II, however, are found in nature and most of the crystalline domains observed in 1920 were type I. A breakthrough in isolating the type I cellulose occurred in 1949 by findings from Bengt G. Rånby. He successfully used sulfuric acid to hydrolyze bulk cellulose, resulting in the formation of CNCs. Sulfuric acid preferentially hydrolyzes the less crystalline Type II cellulose segments, resulting in mostly Type I segments remaining. More extensive procedures for CNC isolation can be found elsewhere.

CNCs are elongated rod-like or whisker shaped particles remaining after acid hydrolysis of either wood and plants pulps, microcrystalline celluloses (MCCs), microfibril celluloses (MFCs) or nanofibrillated celluloses (NFCs). They are considered today as a novel class of nanomaterials with many attractive properties. CNCs are crystals with diameters in the range of 3 to 20 nm and lengths in the range of 100 to 600 nm. These dimensions and the crystallinity depend on the source of cellulose used. Tunicate and bacterial cellulose yield larger whiskers, while cellulose from wood yields smaller structures.

CNCs have many unique properties. The material possesses excellent mechanical properties, including high tensile strain, and unique optical properties, such as high birefringence. Both the raw material and refined products can be manufactured using existing industrial processes. The malleability of CNCs and scalability allow various shapes and geometries of structures to form. CNC fiber can also be made into electromagnetically active or passive composite materials. Studies show that chromophores and other conductive polymers can be added into CNCs to make a conductive or an active electro-optic polymer. CNCs are also renewable, biocompatible, and contain no toxic catalyst components and are in some cases edible (e.g. food and drug binders). Most importantly, CNCs are a "green" material and offer a great alternative to many products currently being made of non-renewable materials or petroleum-based products such as synthetic nanofibers and composites.

The mechanical properties of reinforced CNC in nanocomposite materials depend on how it is processed. The nanoscale dimensions and attractive mechanical properties of CNCs make them ideal candidates to improve the mechanical properties of targeted host materials. The Young's modulus of CNC is stronger than steel and similar to that of Kevlar. For CNCs, the value of the Young's modulus has been reported to be 110-220 GPa in the axial direction and 10-50 GPa in the transverse direction. CNCs are also low in density (1.6 g/ml) and high in tensile strength (7.5-7.7 GPa). The mechanical properties of CNCs are similar to other synthetic optical nanofibers and nanowire. Therefore CNC nanofibers could be made with properties comparable to silica and other synthetic nano fibers. For silica nanowire with diameter range from 280 nm to 520 nm, the Young's modulus is 73.1 GPa and the tensile strength is 2.5-5.5 GPa. For silica optical fiber nanowires with radius less than 200 nm, the ultimate strength ($\sigma_{fract}$) is in excess of 10 GPa. Although these values are slightly smaller than that measured in carbon nanotubes ($\sigma_{fract}$=11-63 GPa), the values are still considerably larger than the values recorded in commercially available high-strength materials like Kevlar ($\sigma_{fract}$=3.88 GPa) and high-strength steel ASTM A541 ($\sigma_{fract}$=0.76 GPa). Therefore, CNC nanofiber composites have comparable mechanical properties to silica and other synthetic nanofibers.

The mechanical properties of nanocomposites films, nanofibers, and CNC-based composites mainly depend on the morphology and dimensions of the two constituents (CNC and polymeric matrix) and the processing techniques. Several factors have been shown to contribute to the mechanical properties of CNC neat films and composites, including (1) The CNC properties and that of any matrix material, (2) The degree of CNC in-plane orientation, (3) The density of CNC-CNC contacting points within the Carbon-Nitrogen (CN) network, (4) Interfacial properties, either CNC-CNC and/or CNC-matrix, (5) The CNC volume fraction, (6) CNC morphology/size, and (7) Moisture content. The large number of factors that can modify the CNC structure within the neat films and composites provides an opportunity to engineer for a wide variety of final composite properties. This is evident in the overlap of properties between the different CNC structures and between different CNC particle types.

Conductive CNC Nanofiber Composites

Though Cellulosic materials are not electrically or thermally conductive, some recent published studies suggest that it may be feasible to prepare cellulosic nanocomposites that have electrically conductive character. Agarwal et al. described how it is possible to assemble alternating layers of oppositely charged polyelectrolyte on cellulosic fibers to increase the electrical conductivity. Van den Berg et al. used pi-conjugated polymers to achieve conductive cellulosic surfaces. The resulting nanocomposite films had enhanced conductivity, which increased according to the amount of conductive nanofibers that were used. As noted by Agarwal et al., a possible application of electrically conductive nanocomposites is the creation of circuitry in a special kind of "smart paper." Azizi Samir et al. took another approach, formulating a cellulosic nanocomposite with polyethylene oxide and lithium imide salt, with an interest in creating a composite that conducts ions. The resulting polymer electrolytes showed a high level of ionic conductivity, in addition to enhanced strength relative to the matrix polymer alone. These studies show the possibility of creating an active CNC composite, even though Cellulosic materials are not naturally electrically conductive.

The properties of nanofibers (NFs) offer improvement in optical sensor design. New optical sensor design for medical, pharmaceutical, environmental, defense, bioprocessing, and food industries applications is driven by the continuous demand for simple, fast, sensitive, and in-situ monitoring techniques. Transducing optical fibers have been used as physical, chemical, and biosensors in the past decade. With a diameter close to or below the wavelength of visible light, optical NFs offers a number of favorable properties for optical sensing. In a standard optical fiber with a diameter much larger than the wavelength of light, the intensity of an evanescent field decays to almost zero at the outer surface of the cladding. Thus, light propagating in these fibers is insensitive to the surroundings until it reaches the small-area endface. With low-loss subwavelength-diameter NFs, however, an evanescent wave can reach beyond the fiber, making it sensitive to index change in the surrounding medium. This gives NFs more flexibility for optical sensing of surrounding specimens within the visible and near infrared spectral range.

CNC NFs contain advantages over traditional synthetic NFs. Traditional synthetic NFs have a high available surface area to volume ratio and high porosity, which make them useful in a wide variety of biomedical applications. CNC NFs also have a high surface area to volume ratio, but additionally have a lower density than traditional synthetic NFs. Additionally, CNC NFs have a relatively highly reactive surface which can be used for grafting specific groups and almost unlimited availability. Unlike other traditional materials such as glass fiber and nylon, CNC maintains it transparent at high fiber content. These conditions make CNC NFs attractive alternatives to traditional synthetic NFs.

CNCs are highly effective reinforcing nanofillers for improving mechanical properties of various electrospun polymer matrices, including poly-(ε-caprolactone) (PCL), poly(vinyl alcohol) (PVA), poly-(acrylic acid) (PAA), polyethylene oxide (PEO), poly(lactic acid) (PLA), polystyrene (PS), and ethylene-vinyl alcohol copolymer (EVOH). Because CNCs are nontoxic, biocompatible, and biodegradable, they have a significant potential in developing fully biodegradable polymer nanocomposites and composites nanofiber for biophotonic applications. Furthermore, recent progress has been made on increasing dispersion of CNCs in the matrix, improving alignment of CNCs along the fiber length and tailoring CNC-matrix interfacial properties. These techniques can be incorporated into design and modeling of new composite CNC NFs.

Many fabrication techniques for traditional synthetic NFs have been established. Continuous nanofiber fabrication using synthetic and inorganic material and polymers such as carbon fiber, $TiO_2$, $SnO_2$, CuO, polycaprolactone (PCL) (nylon-6), poly(vinyl alcohol). Fabrication methods include bottom-up techniques such as chemical or physical vapor deposition and top-down processes such as fiber drawing, usually starting from materials such as glass and polymer. For example, Harfenist et al. reported direct drawing of NFs from solvated polymers. Sumetsky et al. fabricated NFs by drawing standard optical fiber in a microfurnace comprising a sapphire tube heated with a $CO_2$ laser. Tong et al. developed a method for directly drawing glass nanowire from bulk glasses by a sapphire fiber. However, these process are time consuming and expensive.

Newer NF spinning processes, such as electrospinning, are available, reducing the complexity of NF production for uniform, high quality fiber. Past several years, a large number of studies have been conducted to improve mechanical properties of electrospun polymeric nanofibers and composites. Most of the materials used are polymers, making CNC a new material for this type of processing. It has recently been shown, however, that CNC can be effectively fabricated using the electrospinning process.

Research on CNC nanocomposites has been concentrated on the formation of strong but transparent composite materials. An improvement in both strength and transparency has been obtained by isolating nanofibrillated cellulose structures, excluding larger diameter cellulosic fibers, and taking steps to improve the distribution of the nanofibers in the matrix. Recently an organic display system was developed from nanocellulose. Because CNC maintains its transparency at high fiber content, it is flexible and easy to mold into any configuration. This makes it an excellent candidate for a variety of applications, such as substrates for flexible displays and organic light-emitting diode (OLED), components for precision optical devices, windows for automobiles or trains and in the present disclosure an optical composite nanofiber. Other researchers have been intrigued by birefringent and liquid crystal phenomena in well-dispersed suspensions of CNC nanoparticles. Cranston and Gray created a tunable color filter using CNC filled polyelectrolyte multilayer films with a thickness range between 10 to 300 nm. Posiadlo et al. used a similar approach to render cellulosic nanofilaments non-reflective. Bochek et al. shows that a CNC based electro-optic polymer can be made by directly incorporating chromophores into CNC nanocomposites. Because of the high strength and stiffness and optical transparency in visible band, CNCs can be combined with the aforementioned materials to create various passive and active composite nanofibers and thin films. Additionally, this can be done via electrospinning, where the size of fiber can be easily controlled.

Rapid identification of bacteria and viruses has important implications for our daily live and health. Current methods for identification and quantification of particular viruses and bacteria are time consuming and often expensive. Therefore, demand for affordable, sensitive and accurate biosensors with rapid detection systems is increasing. A hand held biosensing device would give fast, reliable results for identifying and quantifying the number of bacteria particles in a sample. An affordable and sensitive hand-held biosensing device for detecting bacteria and viruses is thus something to be desired.

A series of commercial (automated and semi-automated) systems for microbiological analysis have been described extensively in a number of monographs, reviews and articles. Cobra 2024 (Biocom, France) is one of the completely automated microscopic counting systems. It features three computers, attending to sample preparation, staining, filtration, dry and image analysis. This system is capable of detecting bacteria with a low detection limit of $2\times10^4$ CFU/ml with a throughput rate of 150 samples/hr. However, the system is priced around $120,000 (USD). Another system, made by AutoMicrobic System, has a gram-negative identification card (GNI), a gram-positive identification card (GPI). A Yeast Biochemical test kit, made by Vitek Systems, consists of a filling-sealer unit, a computer, an optical reader data terminal, and a multi-copy printer. This GNI system correctly detects *Salmonella, E. coli* and other Enterobacteriaceae isolated from food samples and confirmed identification by the GNI is reported in 4-18 hours. Two other commercial devices are currently available for preparing piezoelectric immunosensors. The PZ 106 Immunobiosensor System, made by Universal Sensors, contains a liquid flow cell and a computer program to make real time assays of biospecific interactions. The second is model QCA 917, made by EG & G at Princeton Applied Research, is designed for simultaneous electrochemical and weight measurements using a dip or a well holder. An Advantage found in these systems is that measurements don't need to be done in incubation, reducing operation time considerably. However, there is a consistent drawback to these devices: they are large, cumbersome and many do not come with disposable electrodes.

There is a definite demand to develop a highly sensitive and accurate portable biosensor system. A system is needed for medical diagnostics, food quality control, environmental monitoring, defense and other industries. Ideally, a biosensor could be designed such that multiple parameters could be detected simultaneously. The medical diagnostic field offers real opportunities for the exploitation of biosensors for bacterial detection. In fact, the opportunity for biosensors to enter into the clinical diagnostic market is wide open since there are very few commercial systems currently available. The most viable opening in the food industry will arise if a biosensor can rapidly detect total microbial contamination. The largest area of environment application lies in the development of biosensors for monitoring bacteria in drinking water, sewages, rivers, reservoirs and supplies. Due to the aforementioned properties of CNC NFs, it is considered highly possible to create a low cost, disposable biosensor from CNC NFs.

Therefore, the issues remained to be solved include how to get nanofibers or composite nanofibers or thin films made of a uniform passive or active material, and there are no reports of composite nanofibers and/or thin films with electromagnetically activated controlled spatial patterns.

SUMMARY OF THE INVENTION

An object of the present invention is to provide a method for fabricating patterned cellulose nanocrystal (CNC) composite nanofibers and thin films for optical and electromagnetic sensor and actuator application.

Another object of the present invention is to achieve these controlled patterns and the layered structure of the fibers. The optically functional materials are made possible by incorporating secondary phases either during electrospinning or post-processing. These secondary phases may include dielectrics, electrically or magnetically activated nanoparticles or polymers and biological cells mechanically reinforced by CNCs.

Another object of the present invention is to provide several paper-based optical sensors and micro devices that possess unique, tunable optical and electromagnetic properties currently unavailable in commercial products. The proposed CNC reinforced composite nanofibers and/or thin films and unique multilayer concentric and spatially patterned nanofabrication techniques will provide an unprecedented opportunity to create a new class of inexpensive biodegradable optical devices and sensors.

Yet another object of the present invention is to increase the use of CNC (natural) reinforcements to replace synthetic fiber (petroleum-based) products with more sustainable, biocompatible and "green" materials in nanotechnology applications. The final implementation will require a shift in the CNC (natural nanofiber) polymer composites industry away from low-cost, commodity products, to higher-cost but higher-value, green and biocompatible CNC products. This will add value to and, increase revenue for the existing paper and forest product industry.

To overcome the aforementioned disadvantages of the conventional technology and to achieve the aforementioned objects, the present invention provides a method for fabricating patterned cellulose nanocrystal (CNC) composite nanofibers and/or thin films for optical and electromagnetic sensor and actuator application, comprising the following steps of: selecting materials for fabricating patterned cellulose nanocrystal (CNC) composite nanofibers and thin films; and fabricating patterned CNCs composite nanofibers and thin films by incorporating secondary phases either during electrospinning or post-processing, wherein the secondary phases may include dielectrics, electrically or magnetically activated nanoparticles or polymers and biological cells mechanically reinforced by CNCs.

According to an embodiment of the present disclosure, in the step of fabricating patterned CNCs composite nanofibers and/or thin films of the method includes the steps of: providing a spin-coat photoresist; patterning the spin-coat photoresist by e-beam lithography; performing Si anisotropic etching by KOH; mixing 10:1 (curing agent) solution of PDMS and pouring the 10:1 solution of PDMS into a Si mold; transferring the patterned spin-coat photoresist onto the PDMS; creating a tooth-shape alignment layer by the PDMS; and disposing a plurality of composite nanofibers and/or thin films on the tooth-shape alignment layer, wherein the steps of the method are performed by a diameter variable extrusion system, a multi-coaxial electrospinning system, a parallel multi-syringe electrospinning system and variable external electric and magnetic field combined with electrically or magnetically active CNC composite.

Moreover, the step of creating a tooth-shape alignment layer further includes the steps of: creating a V grove shape on a Si wafer as a mold; transferring a pattern to the PDMS by directly pouring the PDMS into the Si mold; pressing polymer by the PDMS mold; and obtaining a tooth-shape structure.

Meanwhile, for applications of Cellulose nanocrystal dipole-Liquid crystals, Nanocrystalline cellulose possess several attractive properties such as optical transparency and birefringence, negative diamagnetic anisotropy, solution processable which has attracted an area of interest such as composites or optical materials study. A milestone of nanocellulose applications is the discovery of the Chiral nematic (C-N) structure, indicating that CNC will perform a stable liquid crystal phase after the hydrolysis of paper product. Cellulose nanocrystal in C-N phase is oriented in the parallel direction and the gap between each CNCs have a slight offset that turns the CNC into a spiral arrangement in the perpendicular direction, which makes it become like DNA structure. C-N phase is one of the phase that can change its optical properties through the external stimulation like electrical or magnetic field. Therefore, these changes on optical properties can offer one possibility to practically use these materials in the optical application.

To investigate and understand the correlation between the C-N phase and result optical properties of CNC, the oriental structural analysis is needed. In the fluid state, the pitch of this helical structure is typically in the range of tens of micrometers, caused by a combination of forces like electrostatic repulsion and the van der Waals attraction. The two tug of war forces can determine the ultimate structure, influenced by the concentration, pH level, and cellulose type etc. Therefore, after drying, its pitch can be reduced to submicrometer values, resulting in Bragg reflection of visible light from dried films.

Except for the application related to the C-N CNC, one method presented in the present application is to treat the CNC as nematic Liquid crystal. According to the previous study, the applicant demonstrates that CNC can exhibit high birefringence effect by the shear casting film, where CNCs align in the direction of shear force. The birefringence effect is attributed to the anisotropic refractive index of the CNC. Bruno et al. experiment the negative diamagnetic anisotropy and birefringence of CNC through an external magnetic field. It indicates that the intrinsic birefringence of crystalline cellulose is about 44 at 17T magnetic field.

Another object of the present invention is to provide the application of cellulose nanocrystal for tunable optics. The invention comprises two essential components: preparation of liquid crystalline cellulose and the implantation of CNC liquid crystal for practical application.

As for the Suspension preparation, the as received aqueous suspension type cellulose nanocrystal (11.5 wt %) is mixed with NMP (99%) in 2:1. The suspension is sonicated for 5 mins. After one week of standing in the room temperature, a phase separation will occur. The ratio of the isotropic to anisotropic phase is 4:6. NMP are capable of dispersing CNC with negative surface charges (SO4-), which play an important role in assisting these solvents to break hydrogen bonds between the nanocrystals.

In our case, we align the CNC through an external strong electric field to flip the dipole of CNC. So we confine the CNC in a liquid crystal cell, where we can apply electric field directly on CNC. Firstly, The LC cell (sum) was put onto the hot plate without heating, then the acquired CNC suspension was dipped into the near space of the LC cell. Then turn on the heater to 50 degree C., capillary force will push the CNC suspension into the LC cell. After that, snap both ends of the LC cell to the voltage power supply. To study the behavior of the CNC liquid crystals, a setup was prepared. The He-Ne laser light (630 nm) passes through the polarizer and the CNC LC cell.

It is intended that the aforesaid embodiment is considered as exemplary only, and is not to limit the scope of the present invention.

DETAILED DESCRIPTION OF THE PREFERRED EMBODIMENT

The present disclosure may be embodied in various forms, and the details of the preferred embodiments of the present disclosure will be described in the subsequent contents with reference to the accompanying drawings. The drawings (not to scale) show and depict only the preferred embodiments of the present disclosure, and will not be considered as limitations to the scope of the present disclosure. Modifications of the present disclosure should be considered within the spirit of the present disclosure.

Figure 1:
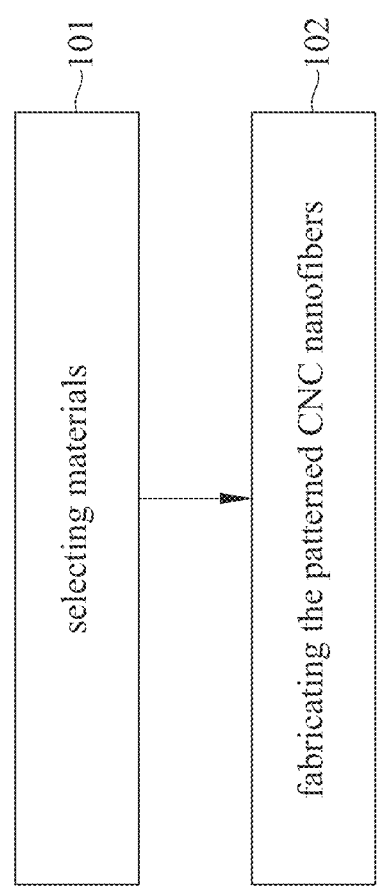
FIG. 1 shows a flowchart of a method for fabricating patterned cellulose nanocrystal (CNC) composite nanofibers and thin films according to the present invention.

FIG. 1 shows a flowchart of a method for fabricating patterned cellulose nanocrystal (CNC) composite nanofibers and thin films according to the present invention.

As shown in FIG. 1, step 101 is to perform selecting materials for fabricating patterned cellulose nanocrystal (CNC) composite nanofibers and thin films for optical and/or electromagnetic sensor and/or actuator application. The operation then proceeds to step 102.

Step 102 is to perform fabricating the patterned cellulose nanocrystal composite nanofibers and thin films by incorporating secondary phases either during electrospinning or post-processing, wherein the secondary phases may include dielectrics, electrically or magnetically activated nanoparticles or polymers and biological cells mechanically reinforced by CNCs.

In the step 101, the material selection will depend on the application for optical and/or electromagnetic sensor and/or actuator application. After the step 102, a new CNC composite NF having unique and tunable mechanical and/or optical properties is produced.

According to the present invention, different embodiments of the method for fabricating patterned cellulose nanocrystal (CNC) composite nanofibers and thin films can be implemented to produce CNC composite fiber, and/or thread, and/or textile, and/or foam for optical, sensor and actuator applications by using a diameter variable extrusion system, and/or a multi-coaxial electrospinning system, and/or parallel multi-syringe electrospinning system through variable external electric and magnetic field combining with electrically or magnetically active CNC composite.

For the CNC composite thread, in the step 102, the thread fabrication uses modified electrospinning process (repulsive force in fiber creating natural twisting swirling motion).

For the CNC composite thin film, in the step 102, the thin film fabrication uses spin coating with diluted CNC solution.

For the CNC composite foam, in the step 102, the foam fabrication uses chemical process and supercritical temperature process.

Meanwhile for the CNC composite foam, in the step 102, as for applications of Cellulose in THz gas detection, a preparation of thin film Cellulose nanoporous foam is disclosed.

Ionic liquid is an alternative solvent for cellulose which is non-volatile and less dangerous comparing with organic solvent, like NMMO and sulfuric acid. Mehmet Isik et al. summarized the recent advances in the development of cellulosic material which is using ionic liquid to directly react with the cellulose. This process for creating the cellulose foam is modified from the process flow developed by Deng. One significant variation of the process is that the concentration of cellulose ionic solution is slightly higher to 5 to 10 wt %. And we put on a step of spincoating to get a liquid thin film, which later turn into a cellulose nanoporous solid foam on the target substrate with a desired thickness.

Figure 2A:
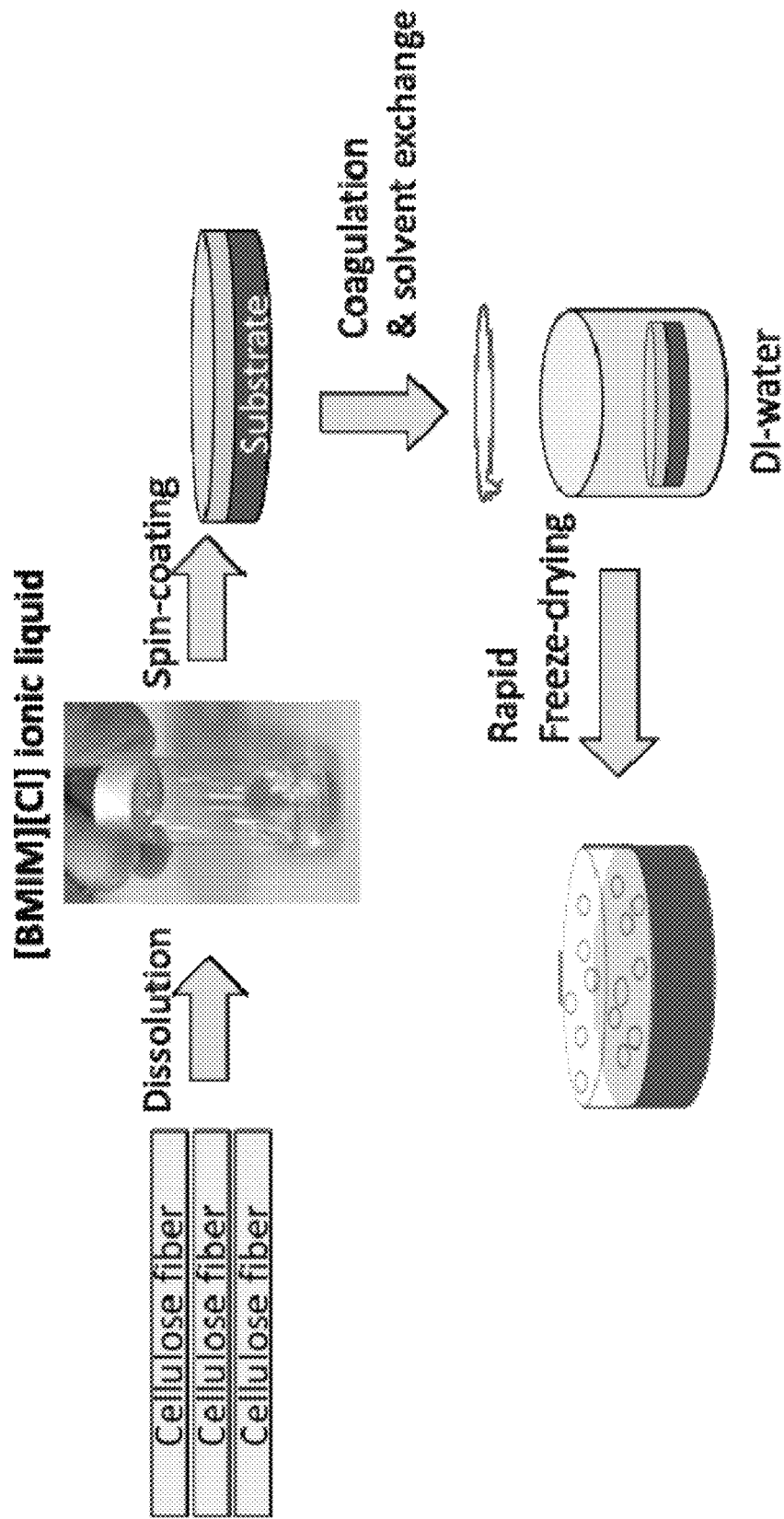
FIG. 2A is a is a schematic view of a process flow to illustrate the foam according to the present application.

FIG. 2A is a schematic view of a process flow to illustrate the foam according to the present application.

As shown in FIG. 2A, in the cellulose ionic liquid preparation process, 1-Butyl-3-methylimidazolium chloride (98+%, ACROS Organics) salt was melt on the hot plate at 80-85° C. where the melting point of [BMIM][Cl] is below that range (65 to 70° C.). After 30 min melting, the ionic salt will be transformed into transparent liquid form solution. After that, cellulose powder (fibers, C6288, SIGMA ALDRICH) was added into the [BMIM][Cl] ionic liquid and further put into the ultrasonic cleaner (40 W) for 12 hr and maintained 85° C.n to form a 5.6% cellulose solution. Yellow and transparent cellulose solution can be done by this process.

Next, in the spin-coating on the substrate process, the solution was spin-coated onto a polytetrafluoroethylene (PTFE) film with glass template: Spin speed: 500 rpm for 10 sec and 5200 rpm for 30 sec.

Finally, in the solvent exchange and rapid-freeze drying process, the substrate is coagulated in the water to obtain a transparent gel followed by being washed with deionized water. After solvent exchange, the substrate placed in a petri dish is then quickly immersed in liquid nitrogen for 0.5 h, which turns the cellulose hydrogel into ice. The function of liquid nitrogen can shrink down the size of the ice crystal to nanoscale through quick freezing. After that, the ice film is put into a freeze drier to remove this ice crystal. The freeze dryer can create a low pressure (100 mtorr) and low temperature (−30°) environment so that the ice can sublimate to gas.

Figure 2B:
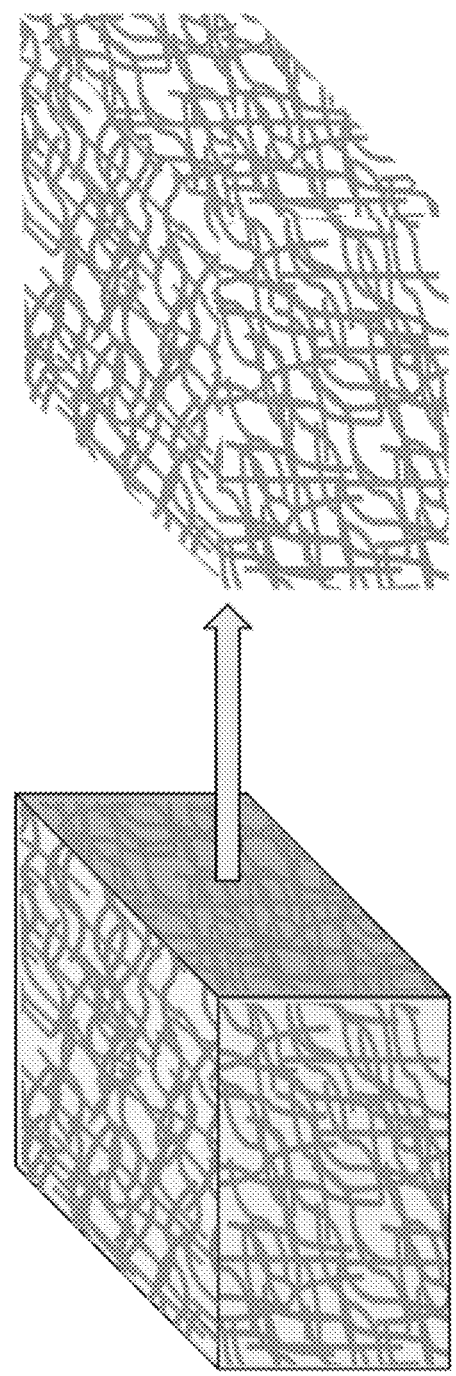
FIG. 2B is the schematic view to illustrate the SEM picture of the cellulose nanoporous foam.

FIG. 2B is the schematic view to illustrate the SEM picture of the cellulose nanoporous foam.

According to the SEM results in the FIG. 2B, it indicates that the polymer hydrogels with the concentration over than 5.6% through the freeze drying process is enabled to have foam nanostructure. The variation of concentration of the cellulose can result in the structural variation.

Meanwhile for the CNC composite foam, in the step 102, as for applications of Cellulose in THz gas detection, an application of cellulose nano-foam in THz technology is disclosed.

The optical gas sensor can offer advanced capabilities such as wireless sensing and high selectivity which are indispensable for monitoring hazardous air pollutions. The fingerprint of various dangerous gases, such as carbon monoxide and methane can be identified through various terahertz detection schemes such as absorption-induced transparency, absorption spectrum, time transient etc. However, to overcome the low sensitivities of current direct spectral measurement methods, we propose a meta surface resonating sensor, in which the concentration of a gas can be detected based on the resonant frequency shift. To further increase the sensitivity, the implantation of cellulose foam nanostructure can enhance adsorption of the gas. Thus, the detection can be determined from the transmission of the THz ray. The configuration of the device is shown in FIG. 2C.

Figure 2C:
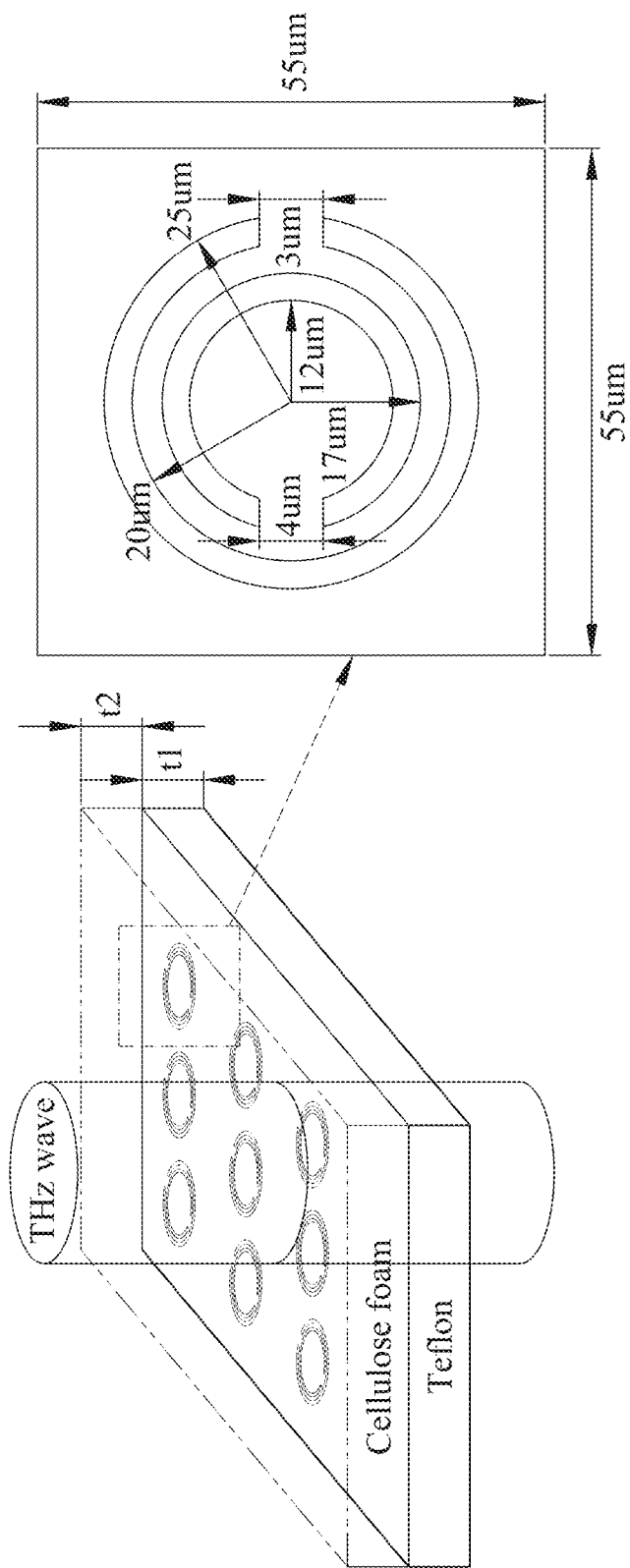
FIG. 2C is a schematic view to illustrate the configuration of the gas sensing device (t1=50 um, t2=100 um) and dimension of the split ring meta senor.

FIG. 2C is a schematic view to illustrate the configuration of the gas sensing device (t1=50 um, t2=100 um) and dimension of the split ring meta senor.

Figure 2D:
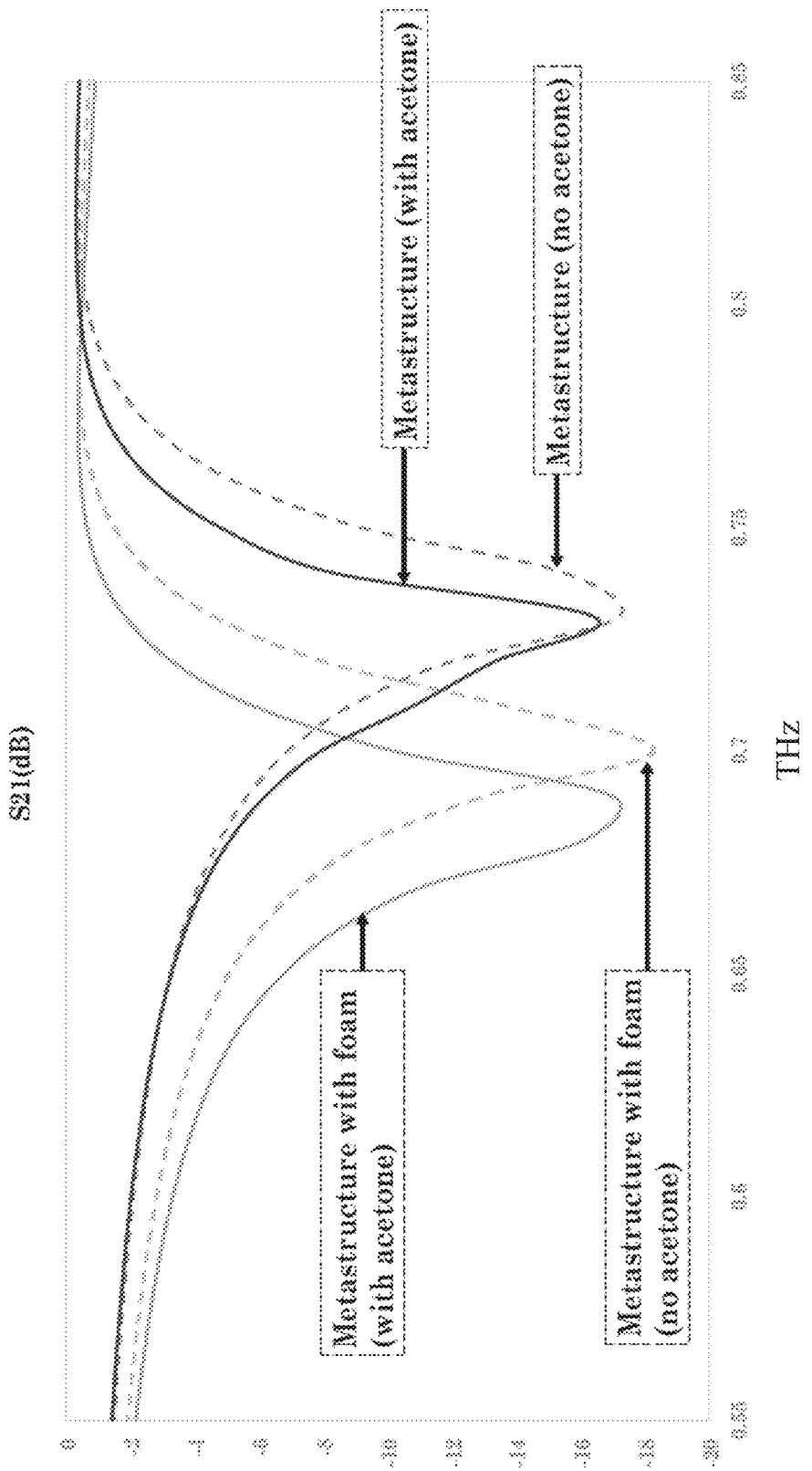
FIG. 2D is a schematic chart to illustrate the simulated coefficient of the meta structure with and without nanoporous foam.

FIG. 2D illustrates a meta surface resonating sensor of an application of cellulose nano-foam in THz technology according to the present invention.

The optical gas sensor can offer advanced capabilities such as wireless sensing and high selectivity which are indispensable for monitoring hazardous air pollutions. The fingerprint of various dangerous gases, such as carbon monoxide and methane can be identified through various terahertz detection schemes such as absorption-induced transparency, absorption spectrum, time transient etc. However, to overcome the low sensitivities of current direct spectral measurement methods, we propose a meta surface resonating sensor, in which the concentration of a gas can be detected based on the resonant frequency shift. To further increase the sensitivity, the implantation of cellulose foam nanostructure can enhance adsorption of the gas. Thus, the detection can be determined from the transmission of the THz ray. The configuration of the device is shown in the FIG. 2C. To estimate the sensing performance of the nanoporous cellulose, effective media theory can be rewritten as follow:

$$\alpha_{eff} = \alpha_{gas}R + (\alpha_{cellulose}1-R),$$

where R, $\alpha_{gas}$, $\alpha_{cellulose}$ and $\alpha_{eff}$ are the filling ratio of pores and the absorption coefficients of gas, cellulose, and the effective media, respectively. Owing to the ultrahigh porous of the cellulose, the filling ratio is high up to 98%, which can reduce the THz attenuation by the cellulose media. In addition, LLL model can be used to derive and calculate the resonate shift of THz:

$$\sqrt[3]{\varepsilon_{eff}} = \sqrt[3]{\varepsilon_{gas}} R + \sqrt[3]{\varepsilon_{cellulose}} (1-R),$$

where $\varepsilon_{eff}$, $\varepsilon_{gas}$ and $\varepsilon_{cellulose}$ are the dielectric permittivity of effective media, air and cellulose, respectively. Based on the simulation result, the resonate peak has a frequency shift (~0.02 THz) in the device with 50 ppm acetone vapor.

FIG. 2D is a schematic chart to illustrate the simulated coefficient of the meta structure with and without nanoporous foam. As shown in the FIG. 2D, FIG. 2D is to illustrate the simulated S21 coefficient of the meta structure with and without nanoporous foam (0 degree polarization). FIG. 2D shows the sensing capability of the fabricated device first investigated under the transmission-type frequency domain terahertz spectroscopy.

Figure 2E:
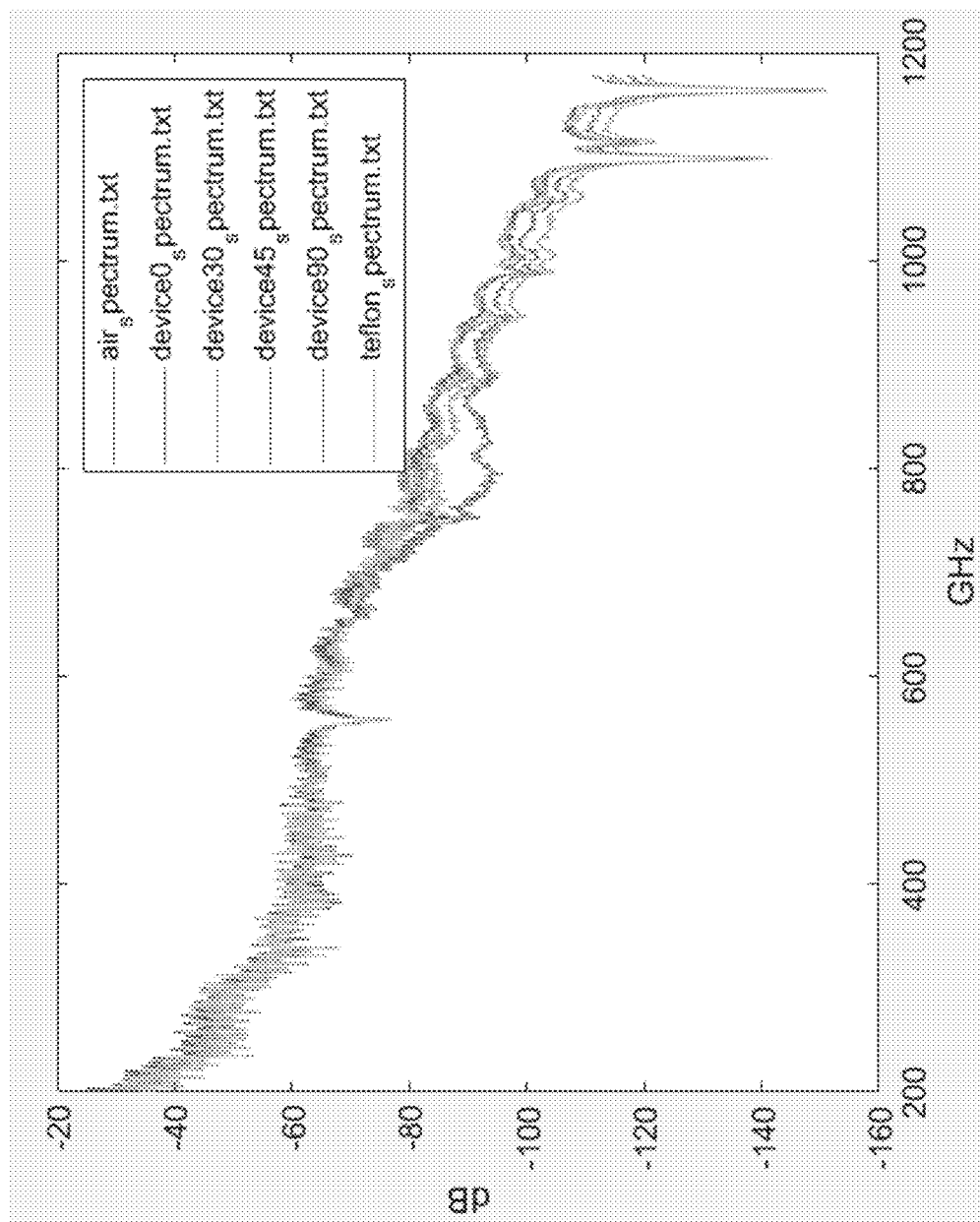
FIG. 2E is a schematic chart to illustare the transmission spectrum of the gas sensor at different polarization.

FIG. 2E is a schematic chart to illustrate the transmission spectrum of the gas sensor at different polarization. The sensor was sealed inside a chamber with gas inlet. Transmission spectrum of the gas sensor at different polarization (0, 30, 45, 90 degree) is shown in the FIG. 2E.

Figure 2F:
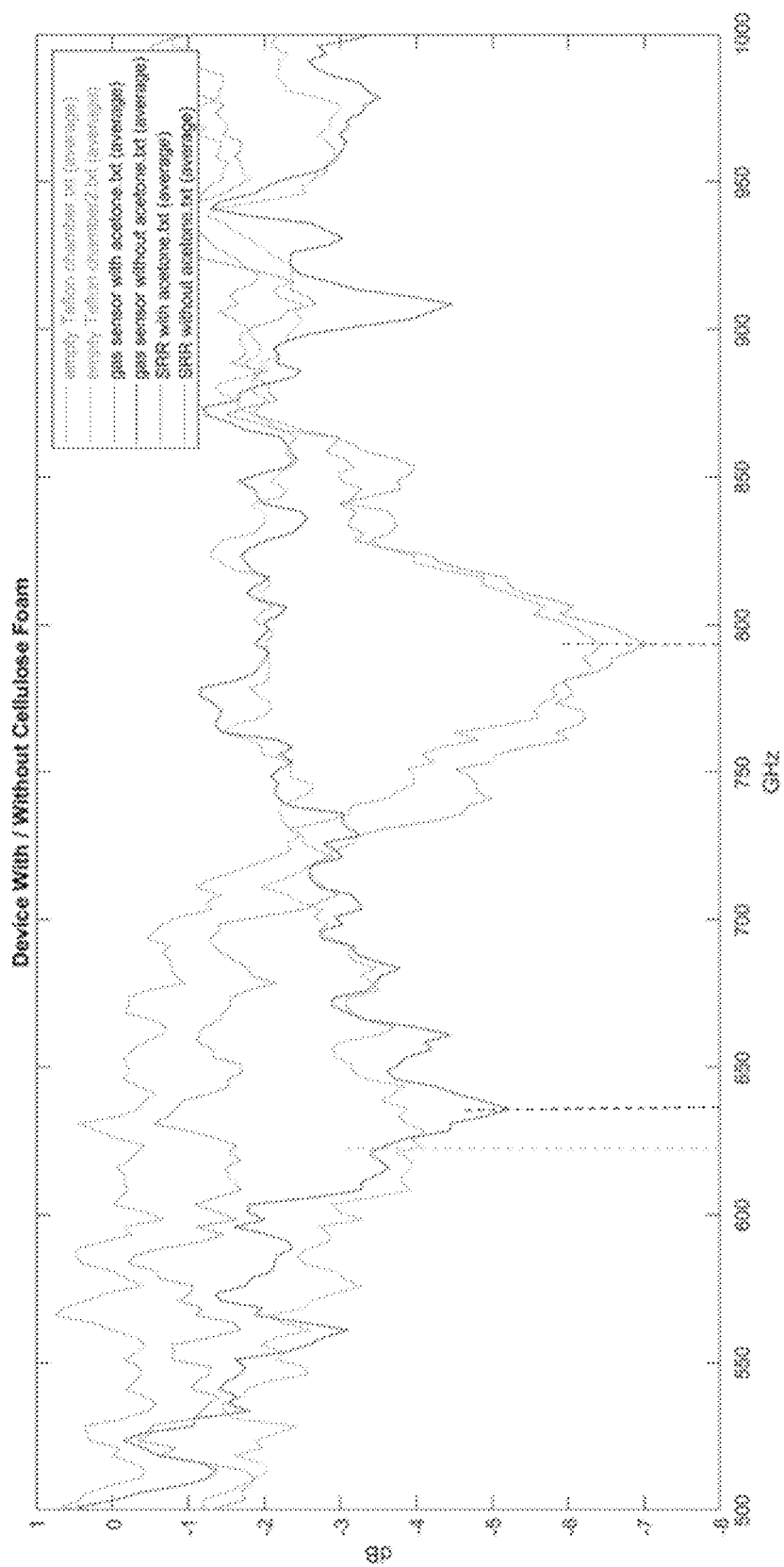
FIG. 2F is a schematic chart to illustrate the spectrum of the sensor with/without acetone inlet.

FIG. 2F is a schematic chart to illustrate the spectrum of the sensor with/without acetone inlet. The S21 spectrum of sensor with/without acetone inlet (50 ppm) is present in the FIG. 2F, which shows a significant resonating shift from 640 GHz to 625 GHz.

For unique application in optical, electromagnetic sensor and actuator application, in the step 102 for nanofibers or micro fibers biosensor, Nanofiber *E. coli* or Multi-Virus sensor uses evanescent sensor and Bragg grating using the diameter variable extrusion system, the multi-coaxial electrospinning system.

For optical application, in the step 102 for nanofiber display system, the parallel multi-syringe electrospinning system and also additional MEMS fabrication process are used to fabricate crisscross layered of electroluminescent CNC nanofibers.

For electromagnetic sensor application, in the step 102, the diameter variable extrusion system with post processing is used to fabricate the CNC composite fiber humidity sensor.

For the thin film IC, optical devices, electromagnetic sensors and actuators application, in the step 102, spin coating processes are used.

For the CNC composite yarn and textile, in the step 102, a modified electrospinning process is used.

For the CNC composite yarn and textile, a modified electrospinning, electrostatic repulsion induced fiber twist, water spout like spinner and sorter and weaving device fabrication is used.

For the yarn, in the step 102, the yarn is made by electrospinning process.

For the CNC composite foam, in the step 102, the foam fabrication process combined with typical clean room process for fabricating meta-material is used to fabricate the CNC composite foam gas absorbing foam combined with the meta-material to improve THz gas detection for electromagnetic sensor.

Figure 3:
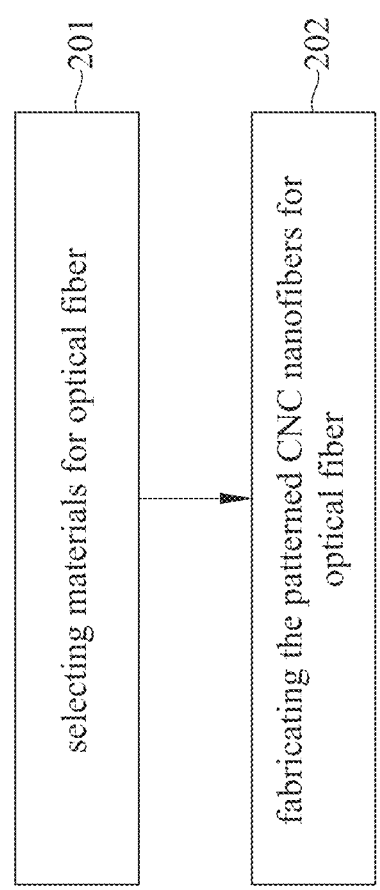
FIG. 3 shows a flowchart of an embodiment of the method for fabricating patterned cellulose nanocrystal (CNC) composite nanofibers and thin films according to the present invention.

FIG. 3 shows a flowchart of an embodiment of the method for fabricating patterned cellulose nanocrystal (CNC) composite nanofibers and thin films according to the present invention.

As shown in FIG. 3, step 201 is to perform selecting materials for fabricating patterned cellulose nanocrystal (CNC) composite nanofibers and thin films for optical fiber. The operation then proceeds to step 202.

Step 202 is to perform fabricating the patterned cellulose nanocrystal composite nanofibers and thin films for optical fiber by incorporating secondary phases either during electrospinning or post-processing, wherein the secondary phases may include dielectrics, electrically or magnetically activated nanoparticles or polymers mechanically reinforced by CNCs.

In the step 201, the material selection will depend on the application for optical fiber application. After the step 202, as shown in FIG. 3, an optical fiber 11 having unique and tunable mechanical and/or optical properties is produced.

Figure 4:
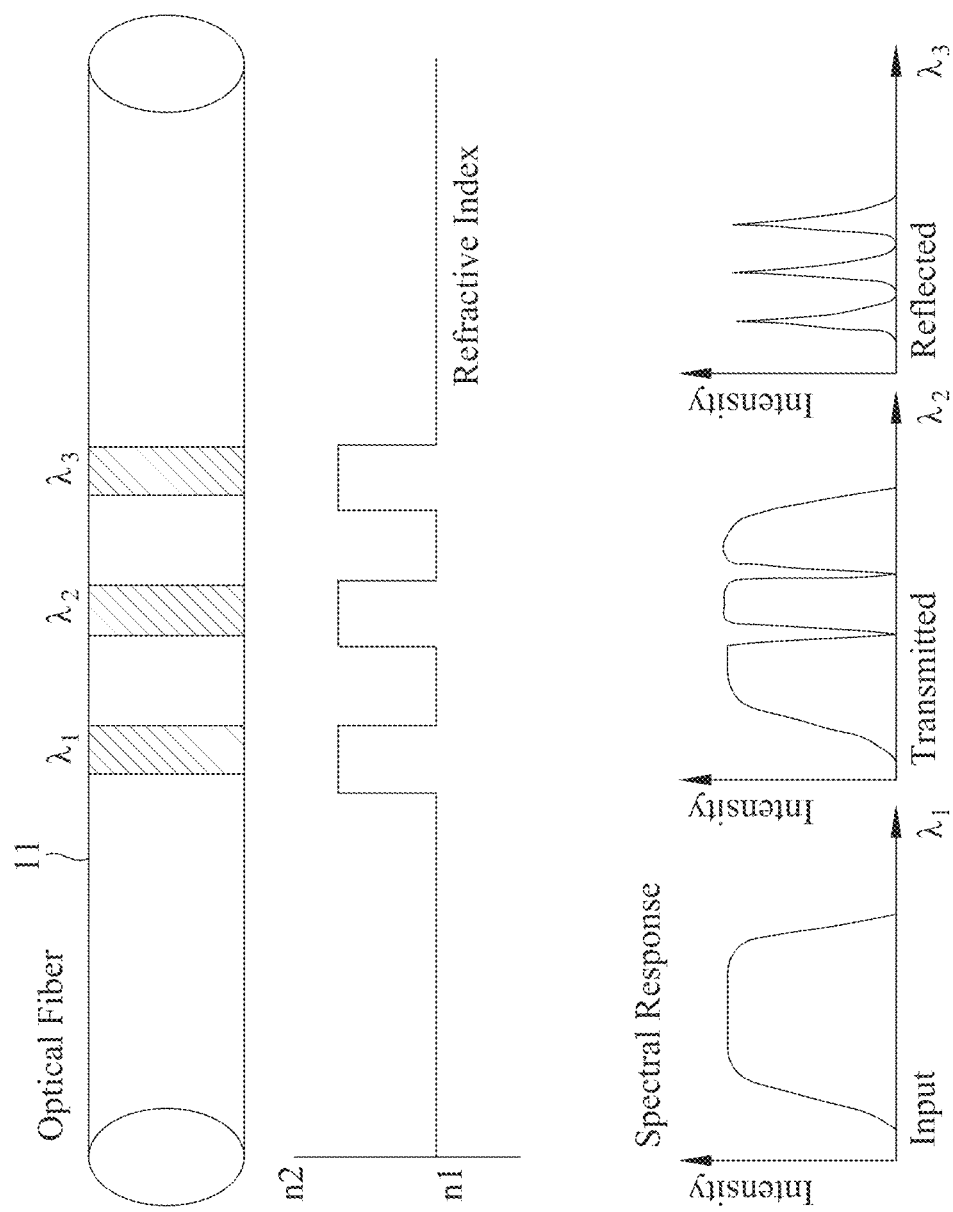
FIG. 4 is a schematic view to illustrate the optical fiber according to FIG. 3.

FIG. 4 is a schematic view to illustrate the optical fiber according to FIG. 3. As shown in FIG. 4, an embodiment of the optical fiber 11 of composite nanofiber sensors (nanofiber Bragg Grating sensors) is illustrated. In all application, once either the electromagnetic or optical composite NFs are developed, they will be utilized to fabricate several passive composite NFs where the optical fiber 11 can be selectively controlled or activated in controlled spatial patterns. To achieve the controlled spatial pattern on the optical fiber 11, a new fabrication procedure and equipment will be developed to allow the layer structure of the optical fiber 11 to be fabricated. In the step 202 of FIG. 3, the optically functional materials will be made by incorporating secondary phases either during electrospinning or post-processing, and by incorporating additional materials or processes during either electrospinning or in the post-processing. These secondary processes may introduce dielectrics, electrically and magnetically conductive nanoparticles, and/or electro optic particles.

The presence of two or more different passive materials within the optical fiber 11 can induce different physical or chemical responses within the same optical fiber 11, raising the possibility of multilayer threads as possible smart devices. Spatially incorporating passive materials will result in localized responses in nano and micro scale, which leads to distributive sensing. The advantage the method of the present invention possesses over a conventional mix-spun material is that the location of adjacent materials can be controlled by the threads, and with the usage of different materials (and air), the threads can also be made porous, which is an essential property in biological applications, such as scaffolds and drug delivery, or in display applications by embedding active materials (such as liquid crystal (LC)) for color and electroluminescent material (such as CdSe/CdS nanocrystals) for light emission. The eventual outcome of the present invention is the creation of a new, patentable product line of green CNC optical fiber sensors at the nano and micron scale that allow active controlled and monitoring of materials at a cellular level.

Optical NF Design

Prior to fabricating CNC nano optical fiber 11, it is necessary to check the optical design based on the measured optical properties. For photonic applications, single-mode waveguide is mostly preferred to avoid multimode interference. Single-mode condition for a freestanding photonic waveguide nanowire is determined by $$\pi \frac{D}{\lambda}(n_1^2 - n_2^2)^{0.5} < 2.405 \quad (1)$$

where D is the nanowire diameter and $n_1$ and $n_2$ are refractive indices of the nanowire and the surrounding material, respectively. The $\lambda_1$, $\lambda_2$, and $\lambda_3$, are wavelengths, respectively. The diameter of a typical nanowire should be close to or smaller than the wavelength of the light. For an 800 nm diameter fiber, the cutoff wavelength for a single mode operation has to be above 1182 nm when operating in air.

The field distribution and wave propagation is obtained using CST numerical software.

Figure 5A:
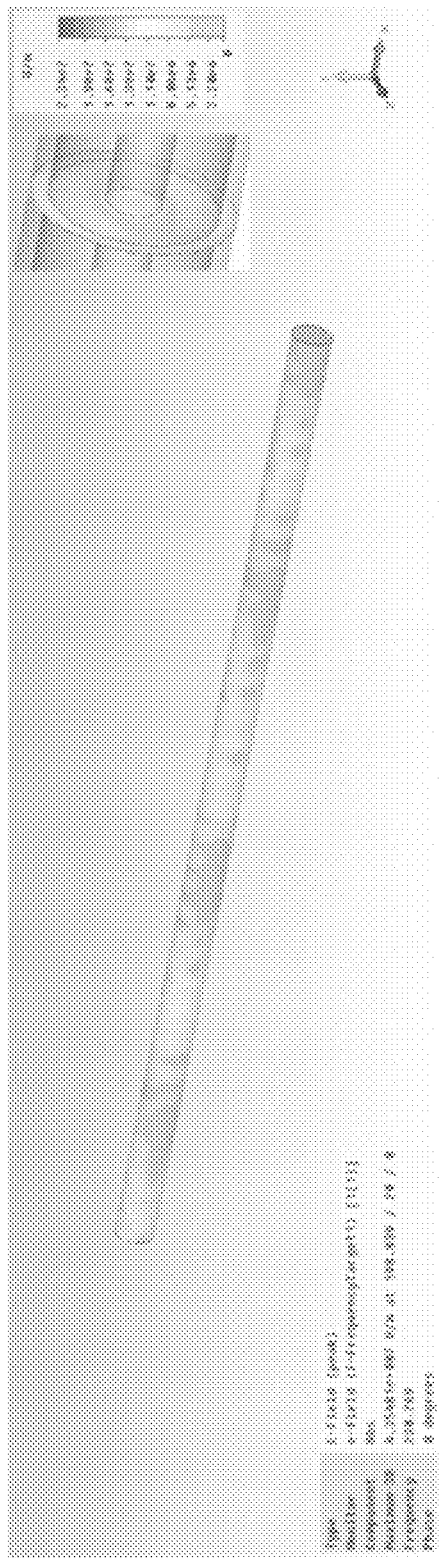
FIG. 5A shows the spatial distributions of optical fields guided by a 800 nm diameter CNC nanowire waveguide at single mode operation with λ=1300 nm in water according to the optical fiber in FIG. 4.

FIG. 5A shows the spatial distributions of optical fields guided by an 800 nm diameter CNC nanowire waveguide at single mode operation with λ=1300 nm in water according to the optical fiber in FIG. 4.

Figure 5B:
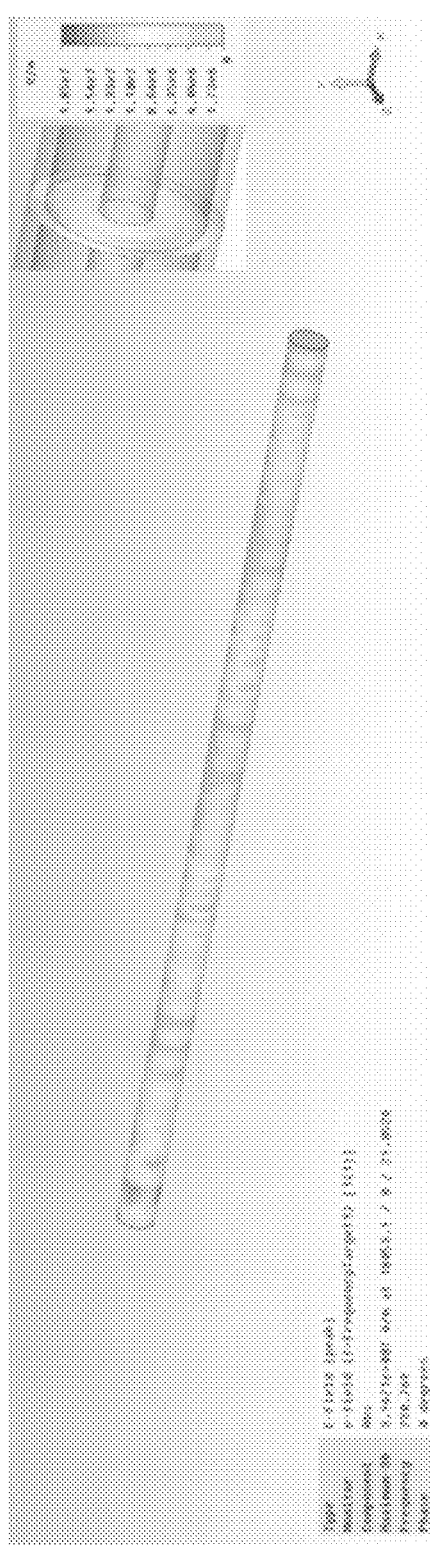
FIG. 5B shows the spatial distributions of optical fields guided by a 800 nm diameter CNC nanowire waveguide at single mode operation with λ=1300 nm in sucrose solution according to the optical fiber in FIG. 4.

FIG. 5B shows the spatial distributions of optical fields guided by an 800 nm diameter CNC nanowire waveguide at single mode operation with λ=1300 nm in sucrose solution according to the optical fiber in FIG. 4.

FIGS. 5A and 5B show optical fields supported by a typical photonic nanowire. Compared with conventional optical waveguides that usually have a compromise between mode confinement and evanescent fields, a free-standing nanowire offers an opportunity to waveguide tightly confined optical fields with a high fraction of evanescent fields, which distinguishes the nanowire from many other waveguiding structures.

As shown in FIG. 5A, an example shows, with 800 nm diameter CNC fiber (n=1.516) operating at 1300 nm (230.76 THz), transmission is 49.5% in water (n=1.330).

FIG. 5B shows the spatial distributions of optical fields guided by an 800 nm diameter CNC nanowire waveguide at single mode operation with λ=1300 nm in sucrose solution while transmission is 46.9% in 65% sucrose solution (n=1.453). It is obvious that the transmission loss increases as field distribution increases outside of the core. This can be attributed to the larger evanescent wave present outside the NF at larger refractive index difference between core and surrounding fluid. This effect will be further exploited for later evanescent and Bragg grating sensor application.

Low-loss connection to the existing optical fiber 11 and fiber optics components is made possible by incorporating a tapered waveguide coupling structure. The NF is stretched from a larger core CNC fiber that maintains the typical fiber size at their input and output, allowing ready splicing to standard fibers and fiber optics components. The observed coupling loss is low (<0.3 dB) and the mode field is maintained.

Figure 6:
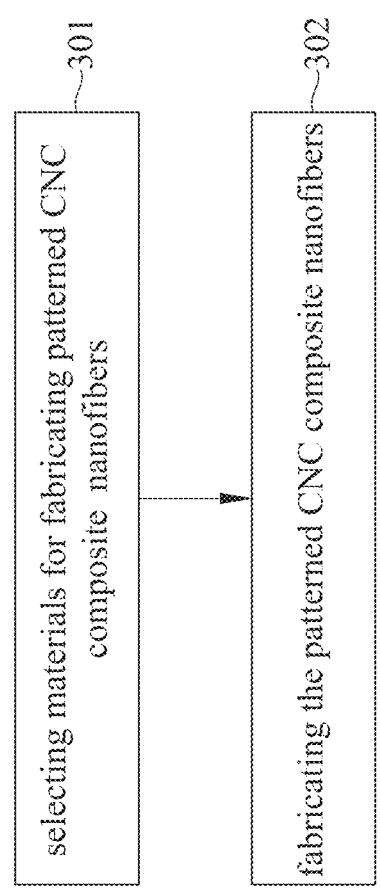
FIG. 6 shows a flowchart of another embodiment of the method for fabricating patterned cellulose nanocrystal (CNC) composite nanofibers and thin films according to the present invention.

FIG. 6 shows a flowchart of another embodiment of the method for fabricating patterned cellulose nanocrystal (CNC) composite nanofibers and thin films according to the present invention.

As shown in FIG. 6, step 301 is to perform selecting materials for fabricating patterned cellulose nanocrystal (CNC) composite nanofibers and thin films. The operation then proceeds to step 302.

Step 302 is to perform fabricating the patterned cellulose nanocrystal composite nanofibers and thin films by incorporating secondary phases either during electrospinning or post-processing, wherein the secondary phases may include dielectrics, electrically or magnetically activated nanoparticles or polymers and biological cells mechanically reinforced by CNCs.

In the step 301, the material selection will depend on the fabricated patterned cellulose nanocrystal (CNC) composite nanofibers and thin films. After the step 302, the patterned cellulose nanocrystal composite nanofibers and/or thin films are produced.

Composite Fabrication

The plasticized CNC composite thin films being the patterned cellulose nanocrystal composite nanofibers and thin films were made by systematically varying the weight ratios of fiber, matrix and glycerol to optimize the film's mechanical strength. The different matrices such as PVA, PLA and PCL/nylon-6 will be used beside glycerol and methanol. PLA and PCL are bio-based polymers and provide an opportunity for a "bio-bio" biodegradable composites. Thermoplastic Polycaprolactam or nylon 6 is synthesized by anionic ring opening polymerization of caprolactam is another good option due to its low pressure and temperature operation. Ring opening polymerization of lactams to generate polyamides has been studied extensively. Caprolactam is by far the most studied lactam. The Nylon 6 prepared from caprolactam compares well with that prepared by the conventional hydrolytic polymerization. Due to fast reaction kinetics and absence of by-products, Nylon 6 produced by anionic ring opening polymerization is a compelling choice for industrial application. Due to high strength, high stiffness, and hydrophilicity, Nylon 6 should be good for a matrix with CNCs. Anionic ring opening polymerization of caprolactam is known to take only minutes and can be done at 140° C. with no byproducts. The rate of monomer conversion to caprolactam is fast and the molecular weights attained are considerably higher than for hydrolytic Nylon 6. The Nylon 6 absorbs 9.7% moisture. Therefore, the ring opening polymerization of caprolactam will be of much interest because ring opening polymer with CNC and natural fiber is an unexplored work. The monomer is also a liquid, thus by direct polymerization, CNC composites NF can be formed without high pressures or temperature.

In the step 301, after a set of matrix and solvent are selected with an optimal weight ratio, the CNC mixture will be prepared. In the step 302, the prepared mixture will then be electrospun into composite NFs. The optimum casting weight percent of fiber (CNC) and matrix (obtained from the previous studies and preliminary results) will be used for electrospinning. The different formulations and solvents will be used, along with varying weight % of PVA, and $H_2O$ dilution. Furthermore, to improve bonding performance and dispersion of CNC in the active composite NF, maleic anhydride and oligomers will be added to the solution.

PVA will be added to give the solution enough viscous and elastic to spin out the continuous NF. The mixture of solution containing of 25 ml of CNC (11 wt %) with 15 ml of PVA (7.2%) was spun out as continuous NF. This formulation and further dilution by adding more ethanol will be used to spin out NF. In addition, ethanol will be added to increase the rate of evaporation. For NF with two layers or more, the concentration of CNC (wt %) will be different in each layer. The inner layer will start with the above CNC concentration and the outer layer with slightly lower or higher concentration will be used by adding more ethanol such as mixture of 25 ml of CNC (11 wt %) with 25 ml of ethanol. This will affect the mechanical and optical properties of these NF. In the step 301, after NF with these mixtures are produced, a small percentage of PVA with an increase of 0.5% wt will be added into the solution to produce CNC-PLA NF. The feeding system is for two layers or more.

In the step 302, the electrospinning is an easily controlled technique. However, the various phenomena taking place while spinning make it difficult to draw a clear correlation between instrument design, operational conditions, and the characteristics of the produced micro or NFs. Processing parameters such as the voltage and distance between the spinning tip and the collector, the properties (conductivity, viscosity, density, surface tension, etc.) of the spinning solution and its flow rate can drastically affect the outcome of the spinning process. Thusly, these variables (conditions) have effects on the quality of the final composite NF. In addition to optimizing typical conditions/variable used in the electrospinning of the step 302, alignment of the CNCs will be controlled by a set of interdigitated electrodes or magnetic coils that are electrically or magnetically insulated from the CNC solution. The electric and magnetic field will attempt to align the CNCs to control its anisotropy and fiber orientation.

In addition to aligning CNC by electric and magnetic fields, surface modification of the CNC and matrix is performed to improve bonding. Maleic anhydride will be used for surface modification and grafting to improve bond performance and dispersion of CNC for both composite NF. PLA oligomers will also be added to PLA to improve surface attached and dispersion of CNC. Effort will be made on improving bonding performance between CNC and matrix and CNC dispersion.

The validated model will be used to fabricate optimum CNC-filled composites of glycerol, and PLA with/without surface modification.

In addition to the composite studies, layered and spatially patterned composite NFs will be investigated. Special design syringe system will be developed to allow coaxial concentric multilayer or non-coaxial composite NFs to be manufactured using electrospinning.

Figure 7B:
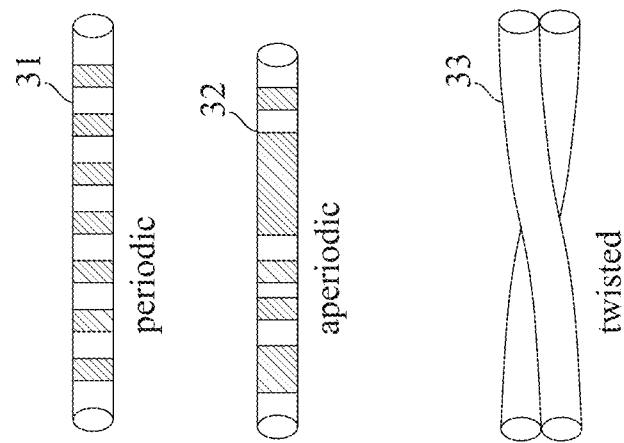
FIG. 7B shows different spatially patterned NFs.
Figure 7A:
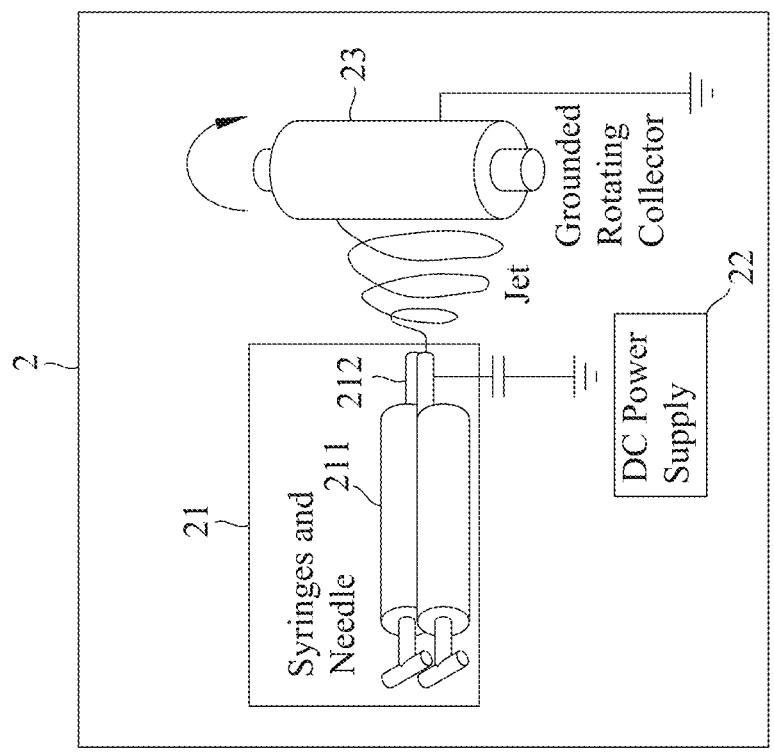
FIG. 7A shows a double syringe electrospinning system.

FIG. 7A shows a double syringe electrospinning system.

As shown in FIG. 7A, the double syringe electrospinning system 2 includes a multiple solution feed system 21, a DC Power Supply 22, and a Grounded Rotating Collector 23.

In the non-coaxial setup, the multiple solution feed system 21 including two syringes and needle 211 allows injection of one or more solutions into another at the tip of the spinneret 212 as shown in FIG. 7A. This depends on the miscibility of the liquids, either a fiber with porosity or a fiber with distinct phases due to phase separation.

FIG. 7B shows different spatially patterned NFs.

As shown in FIG. 7B, on the other hand, twisted layer structure 33 can be generated if immiscible solutions are used. If the feed system 21 is outfitted with a program to control dispensing of each solution, periodic and aperiodic NF grating or spatially spaced multi-element composite fibers 31, and 32, respectively, can be generated (as shown in FIG. 7B). The dispensing process or phase manipulation can be further improved by incorporating special algorithms within the software that is optimized by a theoretical analysis on the fluid dynamic and electrodynamic of the interaction between dispensing solutions.

Figure 8B:
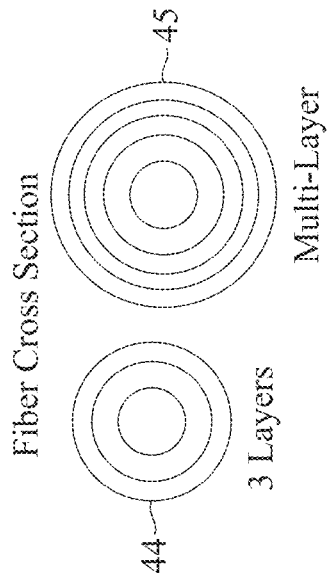
FIG. 8B shows a front view of the composite NFs according to FIG. 8A.
Figure 8A:
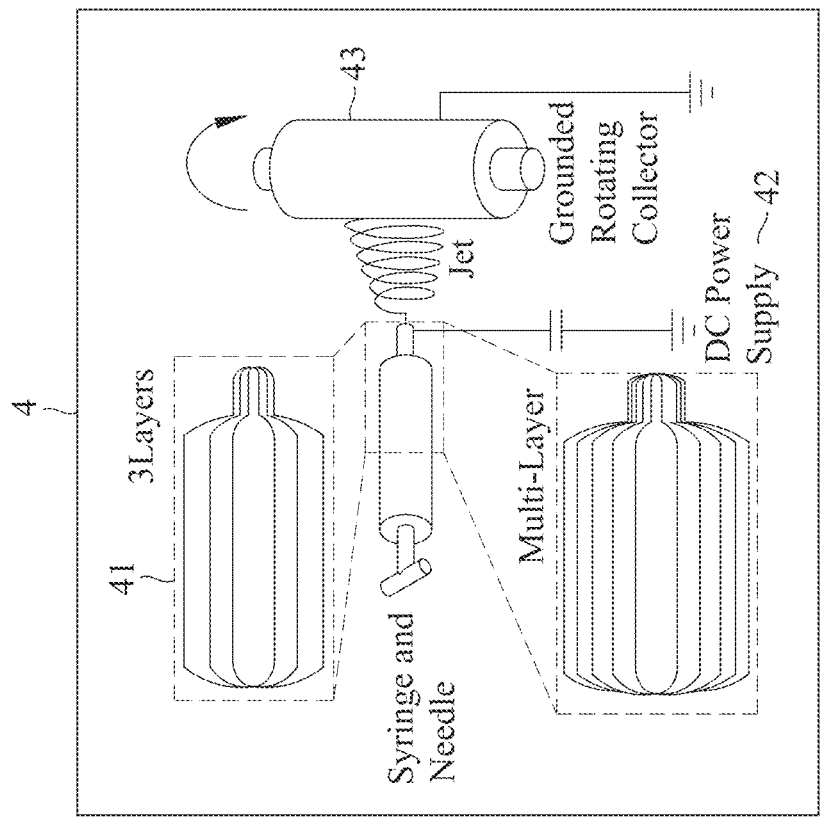
FIG. 8A shows a coaxial electrospinning system.

FIG. 8A shows a coaxial electrospinning system. The coaxial electrospinning system 4 includes a coaxial multiple solution feed system 41, a DC Power Supply 42, and a Grounded Rotating Collector 43.

As shown in FIG. 8A, in the coaxial multiple solution feed system 41, two or more solutions can be injected at the same time. Depends on the miscibility and fluid property of the material, multilayer concentric=NF structure can be created (FIG. 7B).

FIG. 8B shows a front view of the composite NFs according to FIG. 8A. As shown in FIG. 8B, a three layer Fiber Cross Section 44, and a multi-layer Fiber Cross Section 45 are illustrated.

Figure 9:
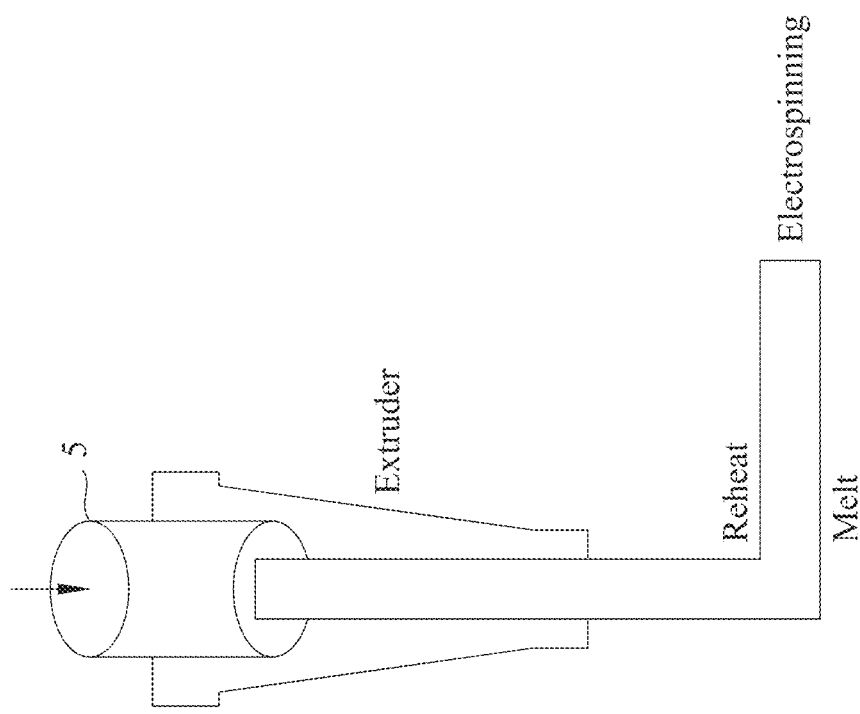
FIG. 9 is a fiber extruder-electrospinning system according to the present disclosure.

FIG. 9 is a fiber extruder-electrospinning system according to the present disclosure. As shown in FIG. 9, the fiber extruder-electrospinning system 5 includes an Extruder.

An alternative to solvent-based electrospinning is melt electrospinning. According to the present disclosure, a modified version of melt electrospinning is provided to accommodate the type of polymer. The technique of the present disclosure differs from the traditional melt electrospinning as a CNC or CNC PLA preform of the concentric layer composite is first created. Then the preform will be reheated to their glass transition temperatures (~ 220° C.) and stretched into a strand of patterned CNC nanofibers using typical fiber draw process (FIG. 9). Like melt electrospinning, the technique of the present disclosure has several advantages over solvent-based electrospinning. There is no need to dissolve the fiber-forming polymer, and thus, no expensive solvent recovery or residual solvent in the fibers, and a 100% quantitative yield is achievable. Generally, melt is a safer and "greener" technology than organic-solvent-based electrospinning. Due to the high viscosity of polymer melts, the fiber diameters are usually slightly larger than those obtained from solution electrospinning. Due to more control in the process, it is expected that the fiber is to be more uniform than the solvent based electrospinning.

Figure 10:
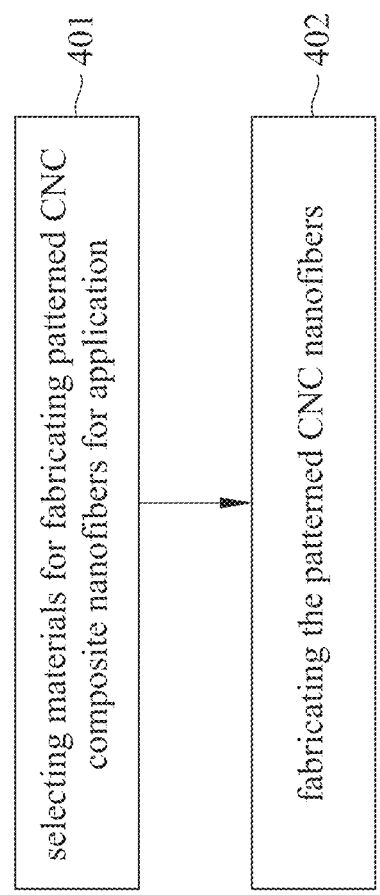
FIG. 10 shows a flowchart of another embodiment of the method for fabricating patterned cellulose nanocrystal (CNC) composite nanofibers and thin films according to the present invention.
Figure 11A:
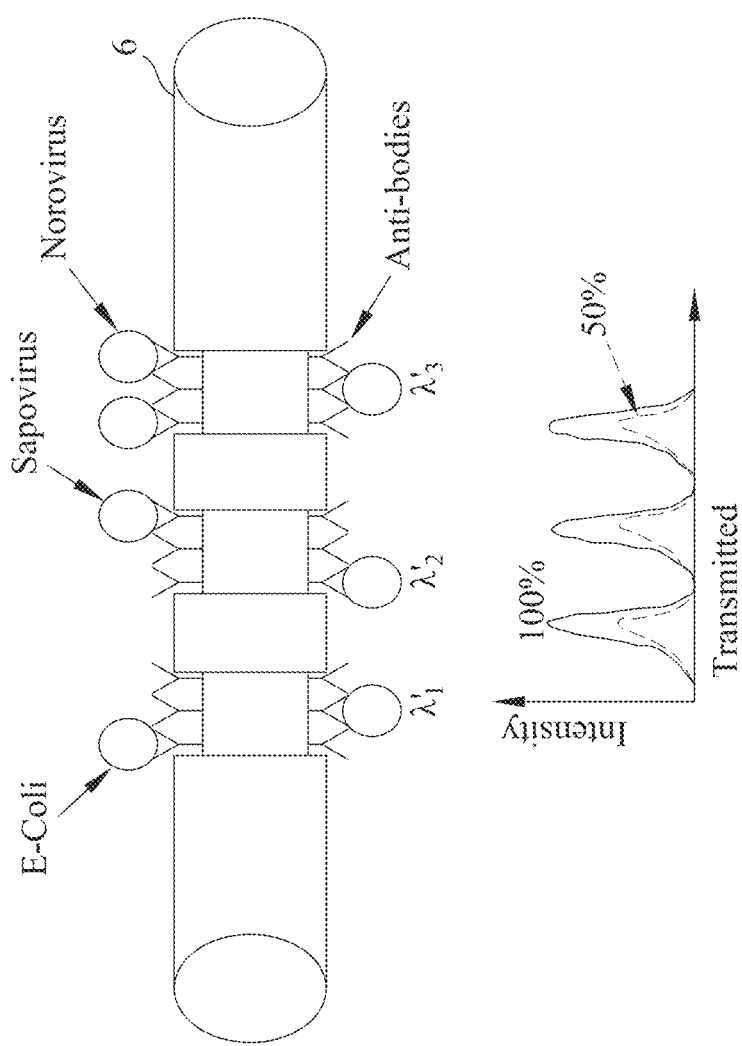
FIG. 11A shows an evanescent NF sensor, wherein the dotted line represents the shift due to the binding of the viruses on the antibody.
Figure 11B:
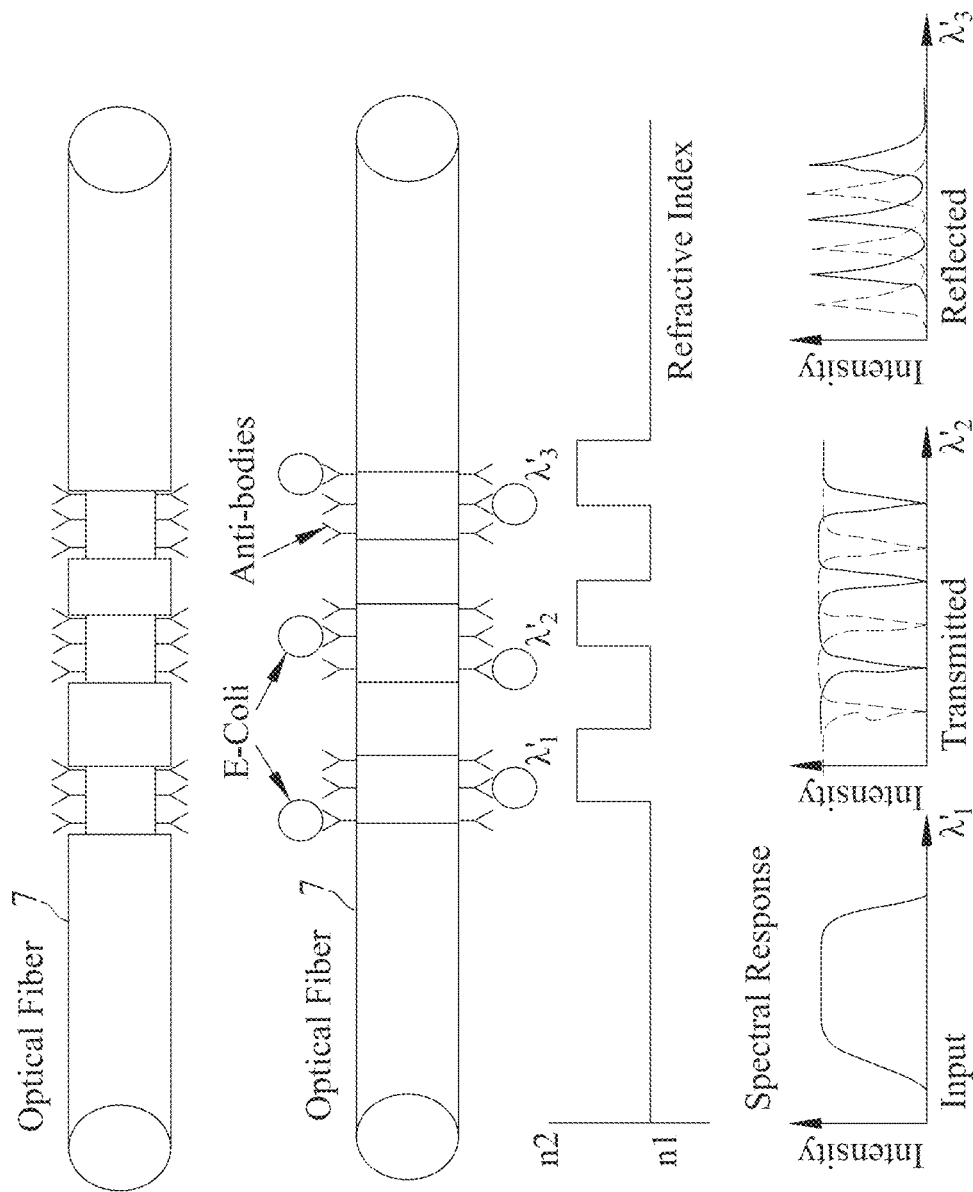
FIG. 11B shows a Bragg grating NF sensor, wherein the dotted line represents the shift due to the binding of the viruses on the antibody.

FIG. 10 shows a flowchart of another embodiment of the method for fabricating patterned cellulose nanocrystal (CNC) composite nanofibers and thin films according to the present invention.

As shown in FIG. 10, step 401 is to perform selecting materials for fabricating patterned cellulose nanocrystal (CNC) composite nanofibers and thin films for optical and/or electromagnetic sensor and/or actuator application. The operation then proceeds to step 402.

Step 402 is to perform fabricating the patterned cellulose nanocrystal composite nanofibers and thin films by incorporating secondary phases either during electrospinning or post-processing, wherein the secondary phases may include dielectrics, electrically or magnetically activated nanoparticles or polymers and biological cells mechanically reinforced by CNCs.

In the step 401, the material selection will depend on the application for optical and/or electromagnetic sensor and/or actuator application. After the step 402, a new CNC composite NF having unique and tunable mechanical and/or optical properties is produced.

According to the present invention, different embodiments of the method for fabricating patterned cellulose nanocrystal (CNC) composite nanofibers and thin films can be implemented to produce CNC composite fiber, and/or thread, and/or textile, and/or foam for optical, sensor and actuator applications by using a diameter variable extrusion system, and/or a multi-coaxial electrospinning system, and/or parallel multi-syringe electrospinning system through variable external electric and magnetic field combining with electrically or magnetically active CNC composite.

For unique application in optical, electromagnetic sensor and actuator application, in the step 402 for nanofibers or micro fibers biosensor, Nanofiber *E. coli* or Multi-Virus sensor uses evanescent sensor and Bragg grating using the diameter variable extrusion system, the multi-coaxial electrospinning system.

For optical application, in the step 402 for nanofiber display system, the parallel multi-syringe electrospinning system and also additional MEMS fabrication process are used to fabricate crisscross layered of electroluminescent CNC nanofibers.

For electromagnetic sensor application, in the step 402, the diameter variable extrusion system with post processing is used to fabricate the CNC composite fiber humidity sensor.

For the thin film IC, optical devices, electromagnetic sensors and actuators application, in the step 402, spin coating processes are used.

For the CNC composite foam, in the step 402, the foam fabrication process combined with typical clean room process for fabricating meta-material is used to fabricate the CNC composite foam gas absorbing foam combined with the meta-material to improve THz gas detection for electromagnetic sensor.

Sensor and Actuator Development

Although the present disclosure has been described with reference to the preferred embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

Here are some examples of sensor application using spatially pattern NFs.

Nanofiber *E. coli* or Multi-Virus Sensor

FIG. 11A shows an evanescent NF sensor, wherein the dotted line represents the shift due to the binding of the viruses on the antibody.

For the first composite sensor, an antigen is simply coated such as *Escherichia coli* (*E. coli*) to the CNC-based composite NFs (during electrospinning process). *E. coli* antibodies will coat the outer surface of the CNC composite NF using the dip coating coaxial electrospinning technique. Antigen of *E-coli* will be coated to the CNC NF. During the coating process, CNC NF will be immersed vertically into Antigen of *E-coli* at a constant speed. The CNC NF is left in the solution for a set period, allowing a thin layer of *E-coli* antigen to deposit itself on the CNC NF. The fiber is then withdrawn at a constant speed to ensure uniformity of the coating layers, verified via SEM.

Using this method (and a new system), a simple multi-band evanescent wave NF *E-Coli* sensor is created based on the refractive index change due to bacteria binding to the antibodies (as shown in FIG. 11A). The power transmitted by the NF with antibody cladding locally replaced by an absorbing medium is given by:

$$P=P(0)\exp(-a) \quad (2)$$

where P and P(0) are, respectively, the power transmitted through the fiber 6 with [P] and without [P(0)] an absorbing medium over the entire fiber length L. $a=r_f\,\alpha_m\,C\,L$ is the evanescent wave absorbance, C is the concentration of the absorbing medium, $r_f$ is the effective fraction of the total guided power in the sensing region and ${}_m$ is the bulk absorption coefficient of the absorbing species. As shown in the equation, evanescent absorbance is directly proportional to the species concentration and the effective fraction of the total guided power in the sensing region of the fiber. By using a concentric electrospinning system to periodically taper the fiber 6 along the axial direction (as shown in FIG. 11A), a distributive sensor is created to detect *E. coli* at different regions. A multi-virus sensor can also be created simply by coating each location with different antibody. Different resonant peaks at each location will allow different viruses to be monitored at the same time (as shown in FIG. 11A).

FIG. 11B shows a Bragg grating NF sensor, wherein the dotted line represents the shift due to the binding of the viruses on the antibody. As shown in FIG. 11B, an Optical Fiber 7 includes a Bragg grating NF *E-Coli* sensor. The Bragg grating NF *E-Coli* sensor can also be constructed using the noncoaxial technique. The basic concept of the Bragg grating is that it functions as a band rejection filter, reflecting a narrow band of light at the Bragg wavelength ($\lambda_B$) according to $$\lambda_B=2n_{eff}\Lambda \quad (3)$$

where $n_{eff}$ is the effective index of the propagating mode and Λ is the grating pitch. The detection will be based on the Bragg wavelength shift due to the effective index change induced by adsorption of *E-Coli* virus on the antibody coating on the Bragg grating sensor (as shown in FIG. 11B). The rejection peaks can either be monitored from the transmission or reflection intensity. A calibration curve will be developed to correlate the level of *E. coli* in test samples based on different detection techniques. The average of the samples will be developed for the calibration curve as the level of *E-coli* bind to the antigen.

The amount of contamination in the sample or *E-coli* will be evaluated by calculating the change of the output signal from a stable baseline to the peak value recorded. Baseline values will be calculated by averaging the sensor signal over large amount of samples, where baseline noise is represented by standard deviation. Absolute change is calculated as the difference between the peak values recorded and the stable baseline value.

In this study, optical biosensor will be developed to detect bacterial/*Escherichia coli* (*E. coli*) in media (solution, e.g. water). Optical biosensors are particularly attractive for detection of bacteria. These sensors are able to detect minute changes in the refractive index or thickness, which occurs when cells bind to receptors immobilized on the transducer surface. They correlate changes in concentration, mass or number of molecules to direct change in characteristics of light.

The target application will be on food-related *E. coli* infections as well as contaminated ground water due to composted manure or human or animal wastes. Other antigens can be and will be added and further develop the cellulose sensor into more complex multi-parameter sensors.

Figure 12:
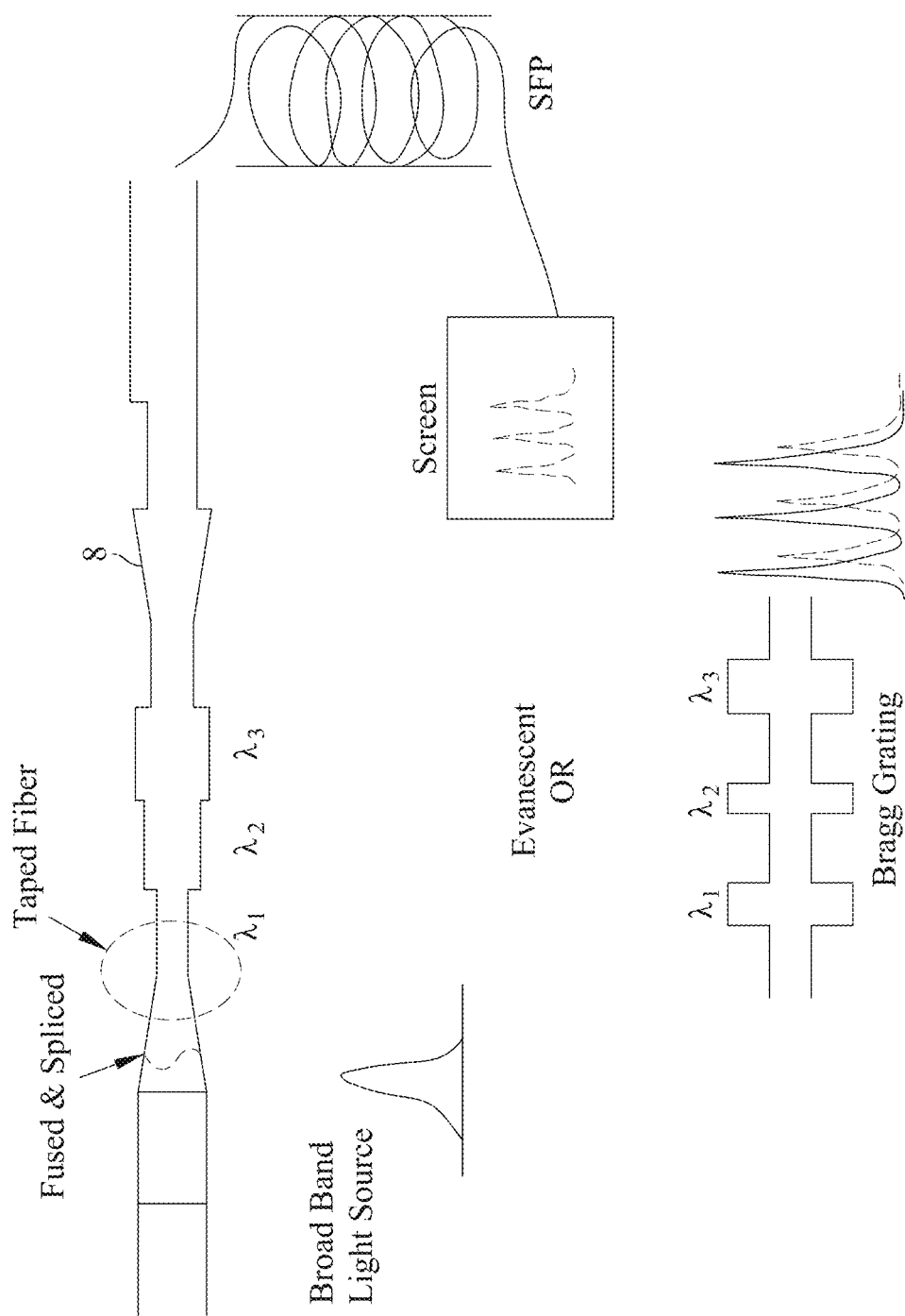
FIG. 12 shows a proposed fused and spliced tapered fiber system incorporated with nanofiber based Bragg grating or evanescent wave sensor.

FIG. 12 shows a proposed fused and spliced tapered fiber system 8 incorporated with nanofiber based Bragg grating or evanescent wave sensor. That is FIG. 12 shows a diagram of fused and spliced tapered fiber ends directly to the light source and detector. The system can be manufactured using the fiber extruder-electrospinning system of the present disclosure described earlier in FIG. 9.

Nanofiber Display System

A more complicated structure such as display system can be constructed using arrays of proposed CNC composite nanofibers and thin films. Electroluminescent colloidal nanocrystal quantum dots such as CdS will be injected into concentric layers of conductive polymer layers during the program controlled coaxial electrospinning process. The coaxial setup will enable a spatially separated two layer composite nanofiber with appropriate active materials such as in FIGS. 8A and 8B to be made. By laying these nanofiber LEDs in an E-beam lithographically written gridded polymeric substrate and selectively applied an E filed to the two crossing nanofibers, the light emitting materials are activated at the crossing points as shown by the outer dots in FIG. 13A and thus create an ultrahigh resolution LED display (<1 mm). The uniqueness of this proposed idea is that the electrodes and active materials are made simultaneously during the fiber fabrication. Many unique composite layer structure and sensors can also be made in the same way using the coaxial and non-coaxial electrospinning setup of the present disclosure.

To avoid ambiguity in display point trigger, a time division multiplexing system will be employed to handle the timing of the firing of these criss crossing CNC composite nanofibers and thin films to correctly create the display image.

Figure 13A:
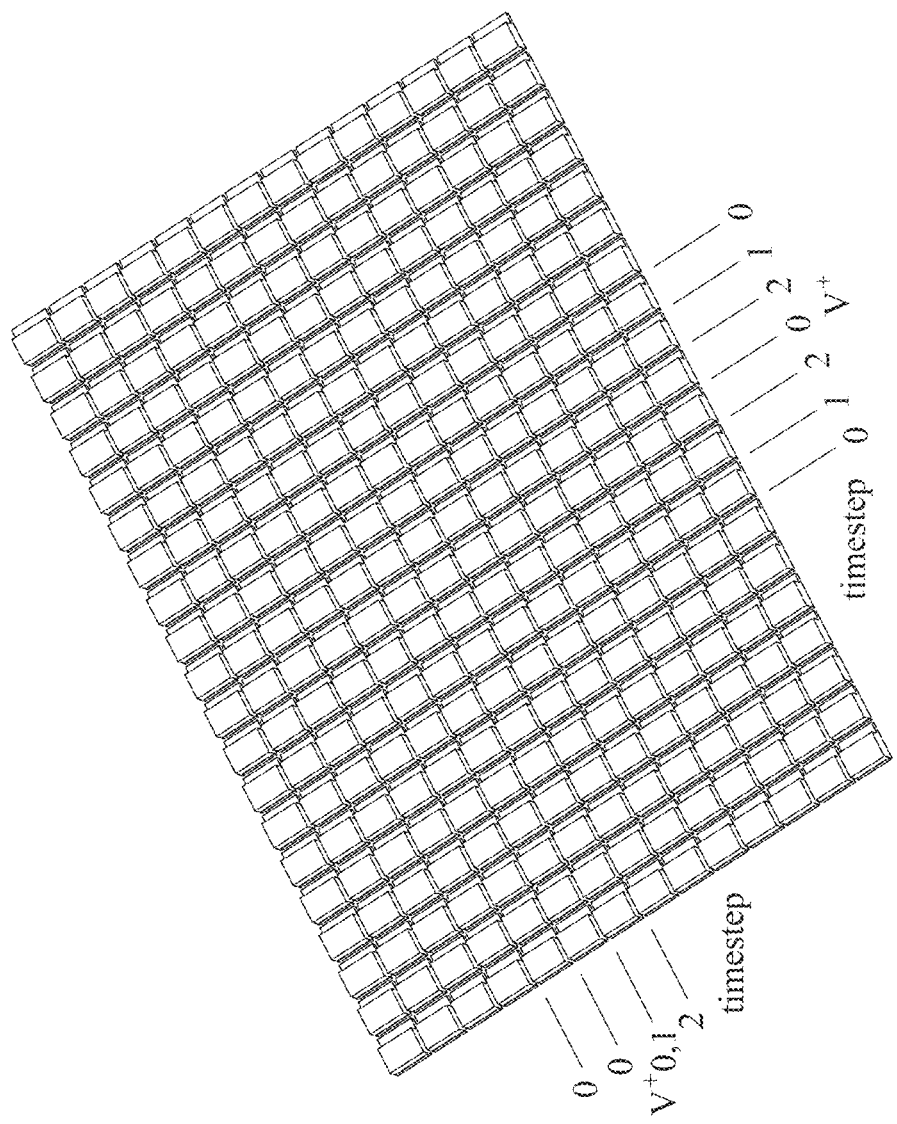
FIG. 13A shows a display formed by crisscrossing layers of nanofiber LEDs lay inside a E-beam lithographically written gridded polymeric substrate.

FIG. 13A shows a display formed by crisscrossing layers of nanofiber LEDs lay inside an E-beam lithographically written gridded polymeric substrate.

Figure 13B:
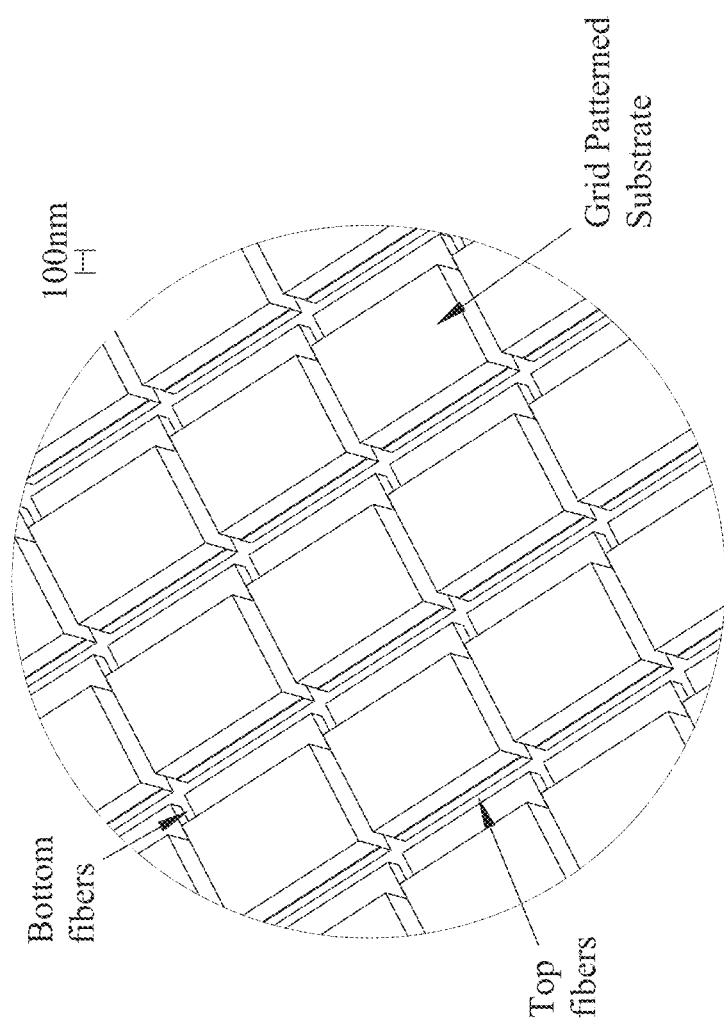
FIG. 13B shows a close up view of the nanofiber LEDs inside the grid patterned substrate.

FIG. 13B shows a close up view of the nanofiber LEDs inside the grid patterned substrate.

Figure 13C:
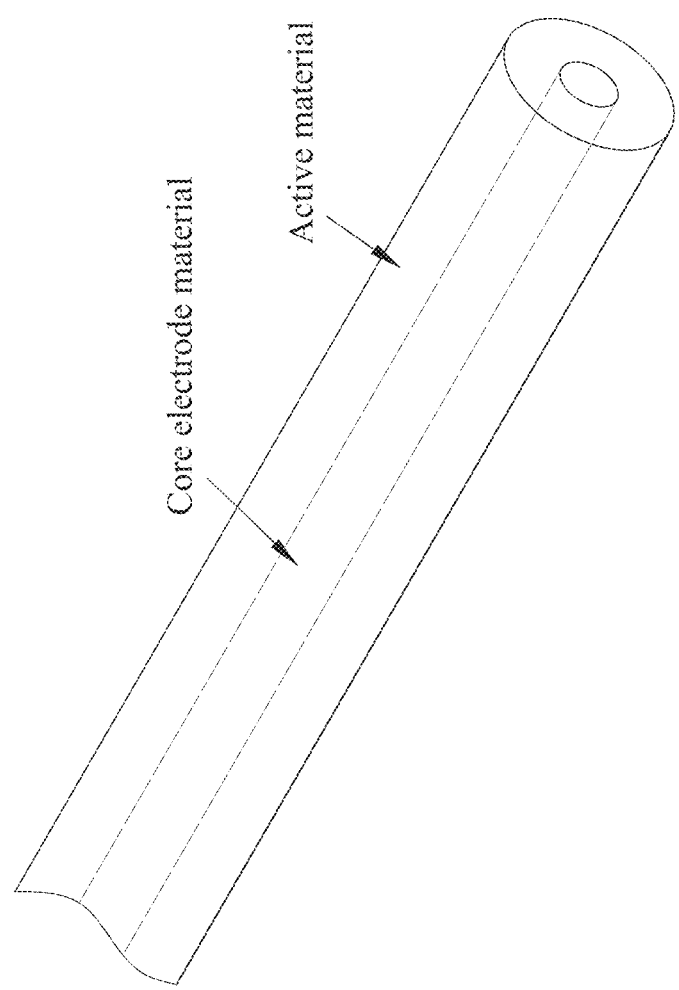
FIG. 13C shows a concentric layer electroluminescent nanofiber, wherein LED with one electrode only turns on only if the other electrode of the crossing LED nanofiber is powered.

FIG. 13C shows a concentric layer electroluminescent nanofiber, wherein LED with one electrode only turns on only if the other electrode of the crossing LED nanofiber is powered.

More details on how to manufacture the above display system:

Light-emitting electrochemical cells (LECs) are simple and single active layer devices that can be easily prepared from wet process such as spin-coating and inkjet printing. Comparing with OLED process, the thick active layer makes the process higher error tolerance and the air-sensitive charge injection layers are unnecessary which is attractive for industrial processing. The first configuration for light emitting electrochemical cells was developed based on conjugated polymer, ionic species, and a buffer polymer. The presence of ionic species in the active layer of conjugated polymer that contains electrolyte to provide the necessary counter ions for doping. When potential field is applied to the counter electrode, the p-type and n-type doping is respectively initiated on the opposite side of electrode and the charge carriers will move between the regions. The recombination of holes and electrons will emit light from the p-n junction of the electroluminescent polymer. The quantum efficiency of LECs is shown below.

$$EQE = b\varphi/2n^2 \quad (4)$$

where b is the recombination efficiency of electrons and holes, $\varphi$ is the exciton-to photon efficiency, n is the refractive index of output coupling.

A basic planer light emitting electrochemical cell is a single layer structure, composed of an air-stable metal layer, and a transparent electrode layer for light coupling out and an active light emitting layer. Comparing with OLED, it doesn't require multilayer structure for electrons and holes transportation and complicated fabrication process. However, for coupling the LECs with fabric, the planer structure is not useful for electronic textile.

Figure 14A:
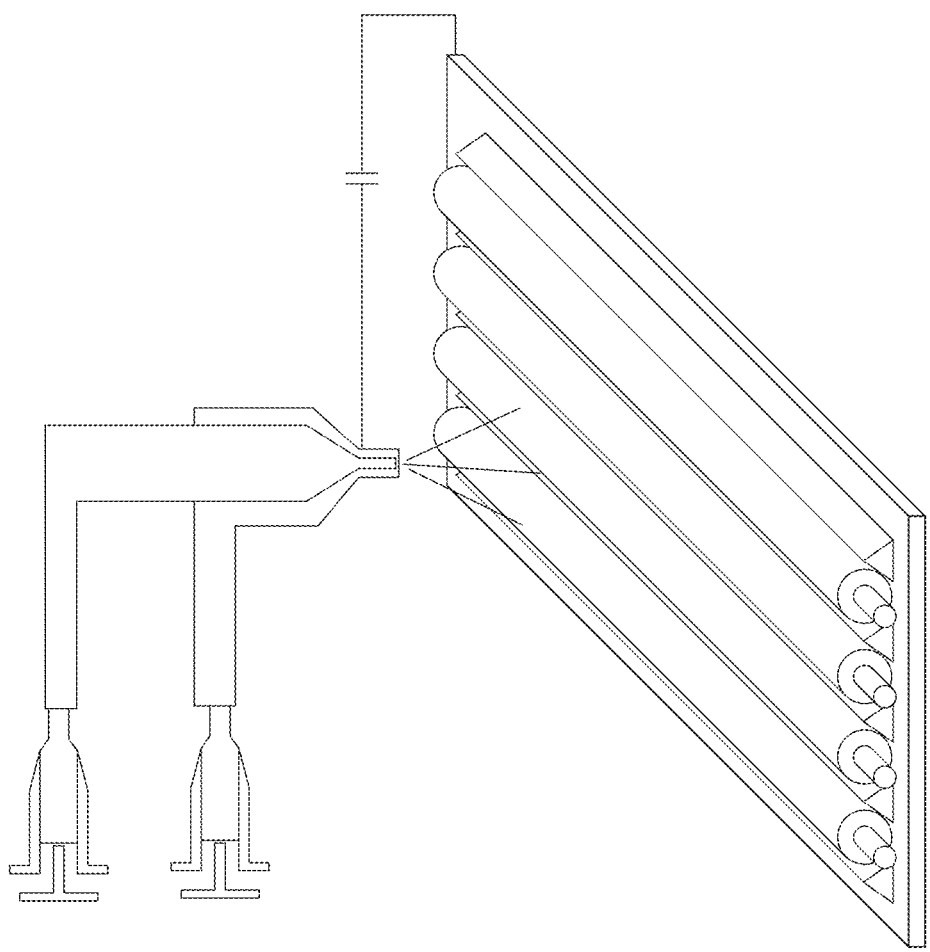
FIG. 14A shows a fabrication process according to the method for fabricating patterned cellulose nanocrystal (CNC) composite nanofibers and thin films of the present invention.

FIG. 14A shows a fabrication process according to the method for fabricating patterned cellulose nanocrystal (CNC) composite nanofibers and thin films of the present invention.

Figure 14B:
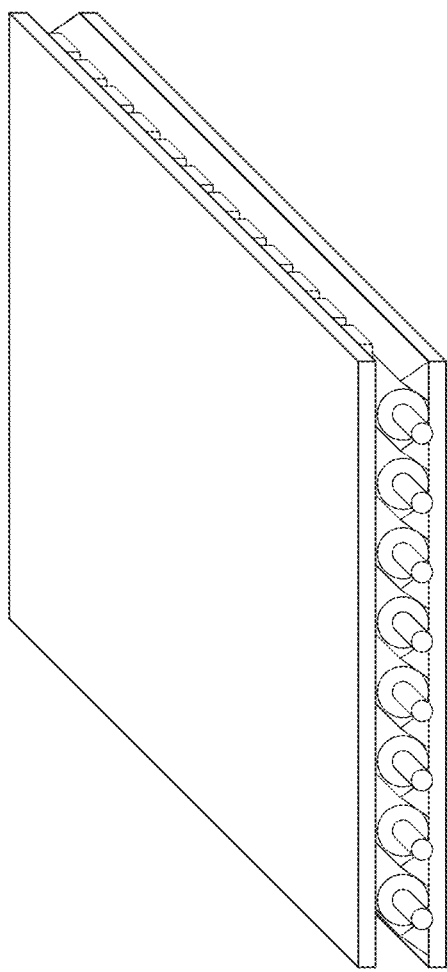
FIG. 14B shows a display device according to the method for fabricating patterned cellulose nanocrystal (CNC) composite nanofibers and thin films of the present invention.

FIG. 14B shows a display device according to the method for fabricating patterned cellulose nanocrystal (CNC) composite nanofibers and thin films of the present invention.

Figure 14C:
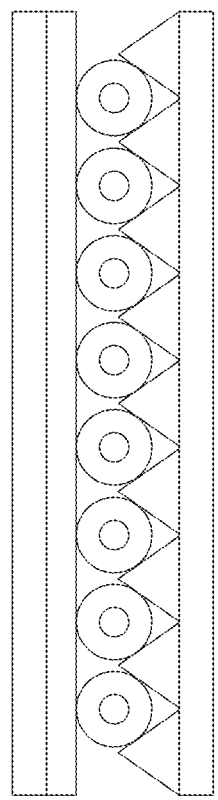
FIG. 14C shows a cross-sectional view of the display device according to the method for fabricating patterned cellulose nanocrystal (CNC) composite nanofibers and thin films of the present invention.

FIG. 14C shows a cross-sectional view of the display device according to the method for fabricating patterned cellulose nanocrystal (CNC) composite nanofibers and thin films of the present invention.

Figure 15A:
FIG. 15A shows a side view of a single element of nanofiber.

FIG. 15A shows a side view of a single element of a nanofiber 9.

Figure 15B:
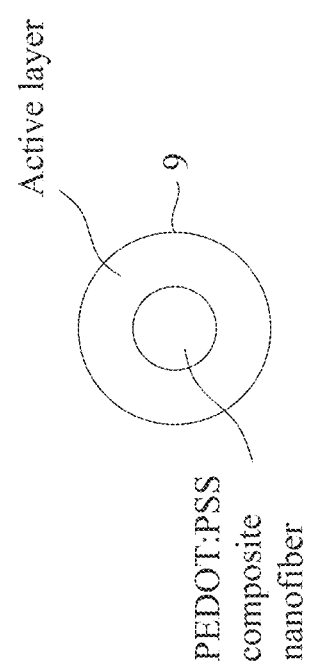
FIG. 15B shows a cross-sectional view of a single element of nanofiber.

FIG. 15B shows a cross-sectional view of a single element of the nanofiber 9.

The present disclosure is composed with active nanofibers, an SU-8 alignment layer, and a top electrode. As shown in FIGS. 15A and 15B, a nanofiber 9 is a two layered structure: the core is high conductive PEDOT:PSS/silver nanoparticles composite, which are not only conductive but also have lower work-function. The outer layer is active polymer which can perform a unique light emitting behavior driven by the electric field. The material of the light emitting layer consists of PEO polymer, Superyellow (Merck OLED Materials. GmbH) and Lithium Salts. Owing to the presence of Lithium Salts, the light emitting polymer undergoes the process of oxidation and reduction, which create a gap for recombination of electrons and holes. PEO polymer possesses the function of electron matrix and also the ability to form nanofibers in the following fabrication process.

The SU-8 alignment layer was fabricated on the glass by solvent assisted micro molding. The process of it can be generally separated into three process: creating the V grove shape on si-wafer as a mold; transfer the pattern to PDMS by directly pouring PDMS into the Si mold; use PDMS mold to press the SU8 polymer and get the tooth shape structure.

For creating the two layered nanofiber, electrospinning combined with coaxial needle is the method to create the two layered morphology. When the nanofiber was pulled out of the needle, the alignment will help to arrange the nanofibers in the direction of grating.

The following are two examples of electromagnetic sensors using CNC composite in microfiber and nanofiber yarn configuration.

Humidity Sensing Fiber

Urinary incontinence is a critical problem in elderly woman and man. It is shown that the problem is usually associated with other disease like Parkinson's disease or dementia. To reduce the risk that patients with physical or intellectual disability suffer from possible ramifications caused by soiled diaper, a new configuration of humidity sensor is provided to apply in the nursing home according to the present disclosure. Many commercial humidity sensors suffer from a complicated fabrication process and are restricted to a planer structure.

CNCs are rod like materials with diameter 3 to 50 nm in diameter and several hundred nanometers long. They are derived from abundant cellulose, through a series chemical process such as acid hydrolysis. Owing to their fascinating optical and electromagnetic properties, they have attracted many researches recently in energy and electronic application. CNC is an affinity to water. The water molecule is easily absorbed by the branch of CNC. It shows that the electrical impedance of cellulose is highly sensitive to water which makes it a good choice for developing a humidity senor.

The present disclosure is to disclose a disposable polymer based humidity sensor in microfiber configuration. The present disclosure is based on a biodegradable Poly(DL-lactide) (PDLLA) fiber dip coated with a thin layer of CNC/PEDOT:PSS on its surface which can detect water vapor stem from body or surrounding. Owing to its light weight flexible fiber shaped, this biocompatible device can be easily for weaving into fabric. Owing to its current fabrication, a long spool of fiber of controllable diameter can be drawn and sensitivity and range can be tune by varying the mixing weight ratio of the composition. In addition to the application in textile electronics, this device is also suitable for detection of water leak in tight spaces or hard to reach areas.

An example of cellulose based composite can be synthesized by physically mixing diluted CNC aqueous solution (5.75%) with PEDOT:PSS (PH1000, Clevios) aqueous solution. Beside these two materials, 99% Isopropyl alcohol (IPA) was used to help mixing the gel-like CNC into PEDOT:PSS. The as mixed suspensions were homogenized by putting into ultrasonic cleaner for 1hr. The extruded PDLLA fibers were first cleaned and degassed. Then the fiber was vertically dipped into the mixed suspension and pulled out with a uniform pulling rate. This pulling process is operated in the room temperature (25° C.). Thickness of coated composite can be defined by the relationship derived by Landau and Levich for a Newtonian fluid:

$$h = 0.94 * \frac{(\eta * v)^{\frac{2}{3}}}{r_{IV}^{\frac{1}{6}}(\rho * g)^{\frac{1}{2}}} \quad (5)$$

$h$: thickness $\rho$: density $g$: gravity constant $\eta$: viscosity $r_{IV}$: liquid-vapor surface tension $v$: dragging speed Ag glue is coated on the surface of the fiber to provide an electrical path of CNC composite and connected to the contact pads.

A CNC Conductive Composite Nanofiber Yarn

Electrospinning is one of the efficient methods to prepare polymer micro or nanofiber. The electrospun nanofibers can be collected and form many configurations of mats by manipulation of the applied electric field, or by changing the ground collector geometry. Traditionally a drum collector spins and collects fibers into a spool. A pair of conductive substrate (counter-electrodes) separating by a gap can be used to collect them uniaxially. For certain applications, like wearable nanotechnology, it is essential to produce twisted yarns instead of parallel fiber columns traditionally found in electro-spinning process. Recently, several groups have successfully produced these yarns. Dalton et al. proposed two ring electrode system with one ring rotating to twist the aligned nanofiber. However, the distance between the two rings limited the production length of the yarn. Ramakrishna et al. resolve this problem by using a dynamic liquid collector to help collect sort and feed the fiber to a mandrel using vortex generated inside a corn shape container placed directly below the spinneret. However, the mechanism is too complicated with too many parameters to control the hydrodynamic motion of water.

In order to solve the problem of collecting nanofiber yarn, a simple solution is presented. The setup is similar to the conventional method for preparing a non-woven mats with two design difference: First, the suspension in this method needs to be conductive and available to form nanofibers. Second, a sharp triangular steel tip is mounted on the top of the metal stage which the vertical distance between the needle and the ground can be adjusted. The triangular tip serves as the ground to attract the nanofibers. Electrostatic force drives the polymer suspension to the electric ground. The overall system setup is shown in FIG. 16.

Figure 16:
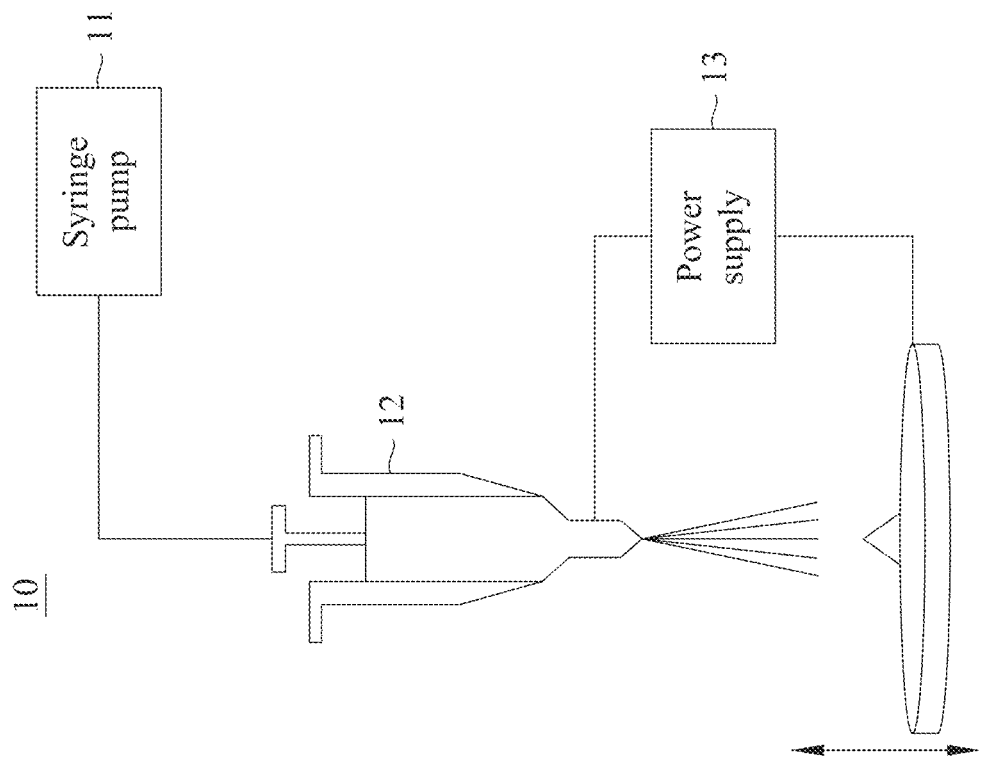
FIG. 16 shows a perspective view of a manufacturing system in accordance with the method for fabricating patterned cellulose nanocrystal (CNC) composite nanofibers and thin films of the present invention.

FIG. 16 shows a perspective view of a manufacturing system in accordance with the method for fabricating cellulose nanocrystal (CNC) composite nanofiber yarn of the present invention.

Figure 17:
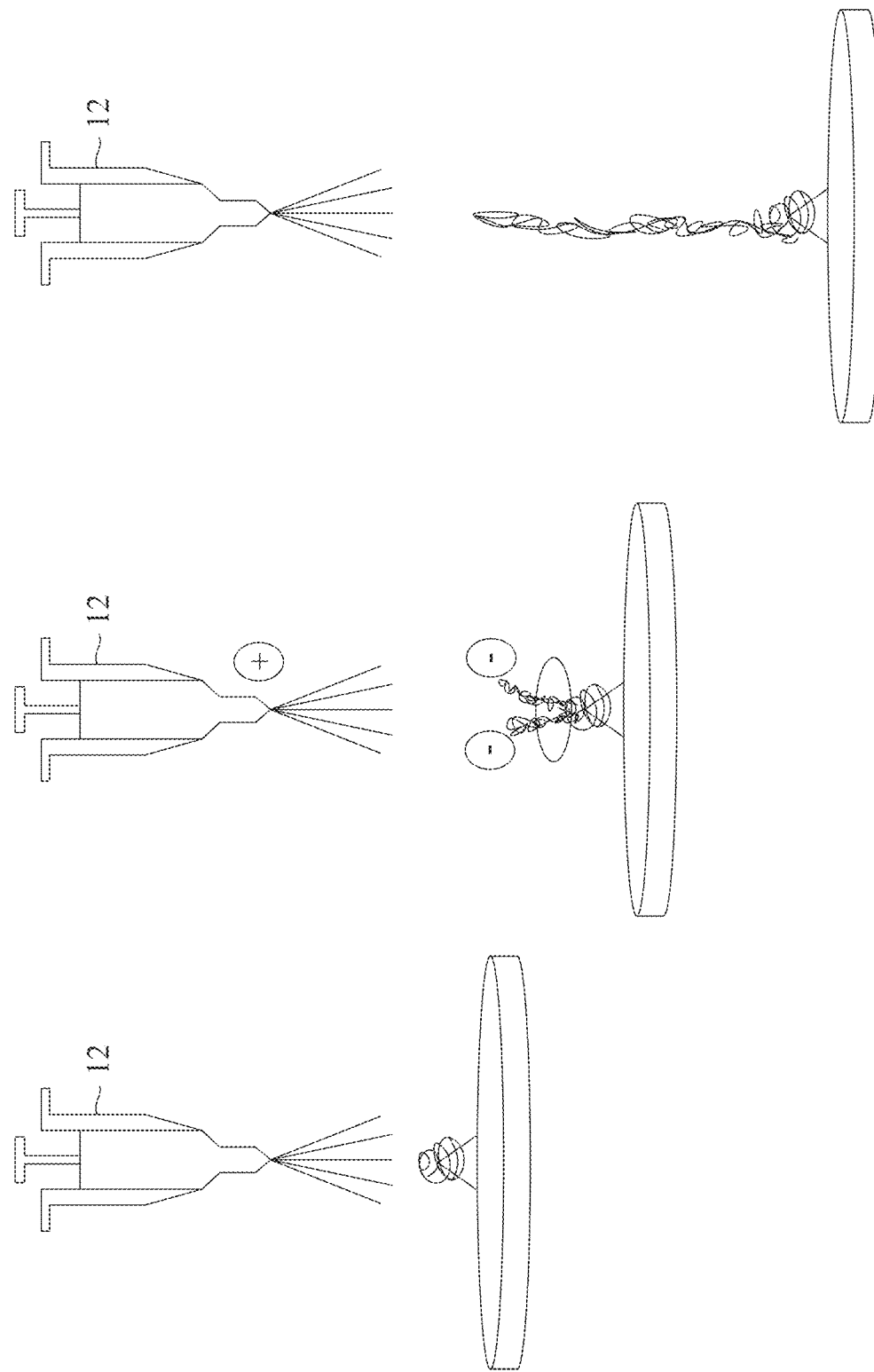
FIG. 17 shows the perspective views of the mechanism of fabricating CNC based yarn according to FIG. 16.

FIG. 17 shows a perspective view of the mechanism of fabricating the CNC nanofiber yarn according to FIG. 16. As shown in the FIG. 16, the manufacturing system 10 includes Syringe pump 11, CNC module 12, Power supply 13, and a metal stage with a steel tip mounted on the top.

Novelty of the mechanism of the present disclosure will be more apparent from the following detailed description. An electrospinning jet generally comprises of three segments, the Taylor cone, the stable segment and the bending segment. The electrically driven solution jet will solidify in the stable region and bending region between needle and collector. Due to the high electric field, the bending segment leads to the formation of disordered nanofiber. In FIG. 17, when the first nanofiber attaches to triangular tip, owing to its conductive properties, it will replace the metal tip as a new ground. The disordered nanofiber on the tip will make it form several tips of nanofibers which represent several electric grounds. Because of these multi-grounds, the electrical repulsion between the fibers tip will make it spin and organize to form the twisted structure. The electrostatic force also elongates the nanofibers and makes them gradually "grow" to the needle.

Figure 18:
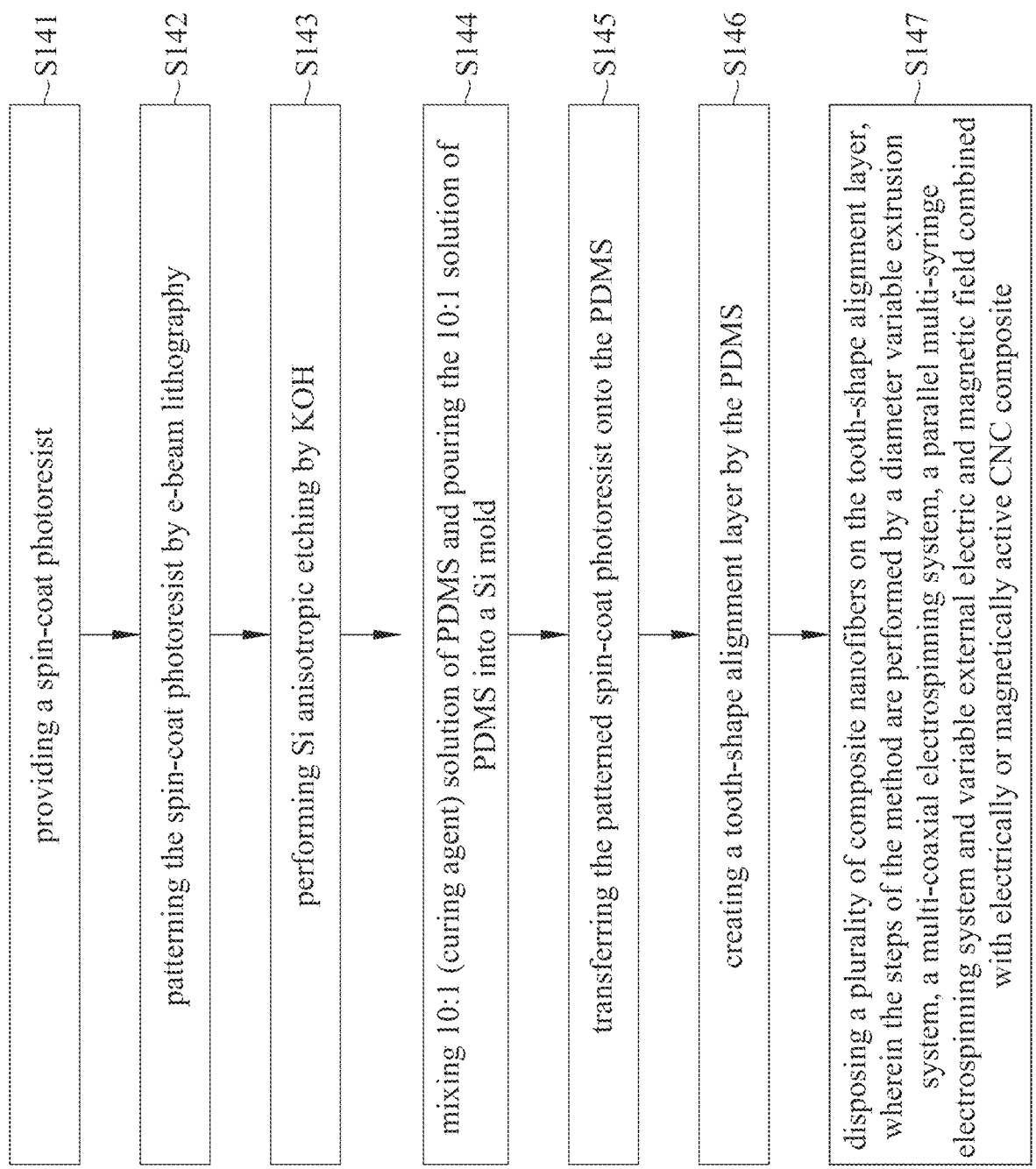
FIG. 18 shows a flowchart of another embodiment of the method for fabricating patterned cellulose nanocrystal (CNC) composite nanofibers and thin films according to the present invention.

FIG. 18 shows a flowchart of another embodiment of the method for fabricating patterned cellulose nanocrystal (CNC) composite nanofibers and thin films according to the present invention.

As shown in FIG. 18, as such, according to the present disclosure, the method for fabricating patterned cellulose nanocrystal (CNC) composite may include the following steps S141-S147:

S141: providing a spin-coat photoresist;
S142: patterning the spin-coat photoresist by e-beam lithography;
S143: performing Si anisotropic etching by KOH;
S144: mixing 10:1 (curing agent) solution of PDMS and pouring the 10:1 solution of PDMS into a Si mold;

S145: transferring the patterned spin-coat photoresist onto the PDMS;

S146: creating a tooth-shape alignment layer by the PDMS; and

S147: disposing a plurality of composite nanofibers and/or thin films on the tooth-shape alignment layer, wherein the steps of the method are performed by a diameter variable extrusion system, a multi-coaxial electrospinning system, a parallel multi-syringe electrospinning system and variable external electric and magnetic field combined with electrically or magnetically active CNC composite.

Moreover, the step S146 of creating a tooth-shape alignment layer further comprise the steps of: creating a V grove shape on a Si wafer as a mold; transferring a pattern to the PDMS by directly pouring the PDMS into the Si mold; pressing polymer by the PDMS mold; and obtaining a tooth-shape structure.

In addition, the suspension is composed of PEDOT:PSS (PH1000, Clevios), Cellulose Nanocrystals (University of Maine) and PVA (First Chemical Manufacture Co.). An example of the composition of the suspension is shown in Table 1. The working parameters are shown in Table 2.

TABLE 1

Composition of the CNC/PEDOT:PSS/PVA suspension

|  | PEDOT:PSS | CNC | PVA | water |
|---|---|---|---|---|
| Weight percent | 0.38% | 1.50% | 5.56% | 92.56% |

TABLE 2

Working parameters

|  | Feed rate | voltage | distance | needle size |
|---|---|---|---|---|
| working parameter | 5 uL/min | 10 KV | 12 cm | 30 gage |

Figure 19B:
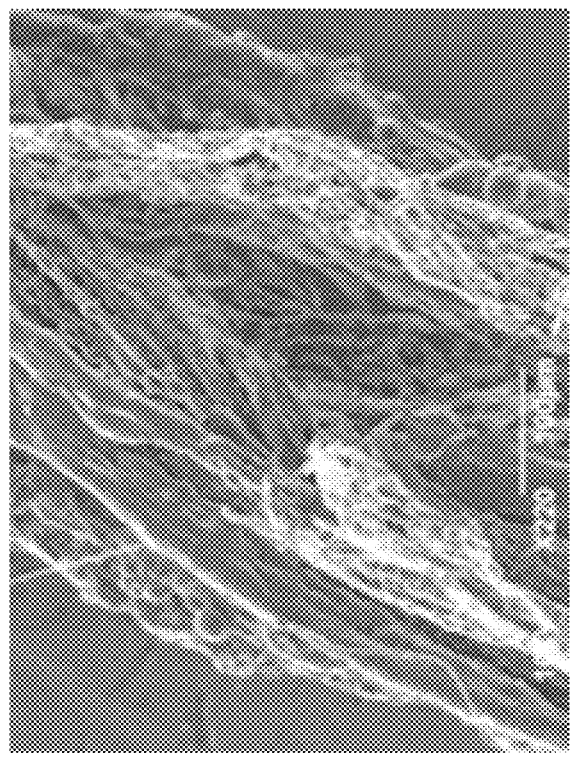
FIG. 19B shows a scanning electron microscope (SEM) image of the CNC based nanofiber yarn.
Figure 19A:
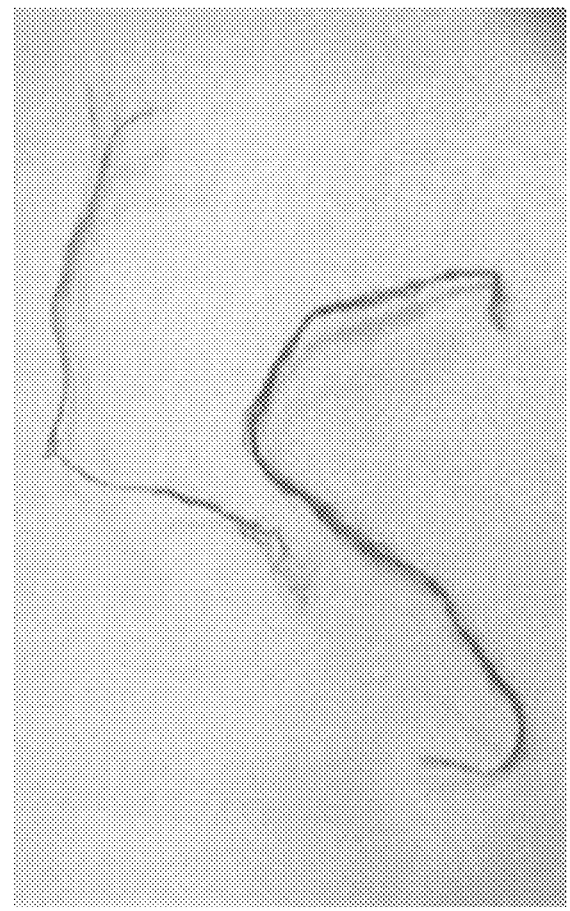
FIG. 19A shows the CNC based nanofiber yarn.

In addition, FIG. 19A shows the CNC based nanofiber yarn; and FIG. 19B shows a scanning electron microscope (SEM) image of the CNC based nanofiber yarn.

Further, potential applications include smart clothing (monitoring humidity, temperature, heart rate, provide electric interconnect, lighting, display etc.) and wearable health care sensor-based systems for point of care monitoring and diagnostic.

Although the present disclosure has been described with reference to the preferred embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

The invention claimed is:

1. A method for fabricating patterned cellulose nanocrystal (CNC) nanofibers, comprising the steps of:
    selecting CNC materials for fabricating the patterned CNC nanofibers; and
    fabricating the patterned CNC nanofibers by using an electrospinning process in a multi solution electrospinning system, the fabricating steps comprising:
        dispensing at least two CNC solutions comprising the CNC materials using a multi solution feed system in the multi solution electrospinning system;
        collecting the dispensed CNC solutions with a grounded rotating collector to fabricate the patterned CNC nanofibers; and providing DC power from a DC power supply.

2. The method according to claim 1, wherein the CNC solutions dispensed by the multi solution feed system comprise immiscible solutions for fabricating patterned CNC nanofibers having twisted layer structure.

3. The method according to claim 1, wherein dispensing of the CNC solutions by the multi solution feed system is program controlled to fabricate patterned CNC nanofibers having periodic grating, aperiodic grating or spatially spaced multi-element composite fibers.

4. The method according to claim 1, wherein the CNC materials comprise an electrically active CNC composite and an external electric field is incorporated in the electrospinning process.

5. The method according to claim 1, wherein the CNC materials comprise a magnetically active CNC composite and an external magnetic field is incorporated in the electrospinning process.

6. The method according to claim 1, wherein an antigen is coated to an outer surface of the patterned CNC nanofibers with a dip coating process during the electrospinning process for fabricating a biosensor.

7. The method according to claim 1, wherein the multi solution electrospinning system is a parallel multi syringe electrospinning system and the multi solution feed system is a parallel multi syringe feed system comprising at least two parallel syringe and needles for dispensing the at least two CNC solutions.

8. The method according to claim 7, wherein the CNC solutions dispensed by the multi solution feed system comprise immiscible solutions for fabricating patterned CNC nanofibers having twisted layer structure.

9. The method according to claim 7, wherein dispensing of the CNC solutions by the multi solution feed system is program controlled to fabricate patterned CNC nanofibers having periodic grating, aperiodic grating or spatially spaced multi-element composite fibers.

10. The method according to claim 1, wherein the multi solution electrospinning system is a coaxial syringe electrospinning system and the multi solution feed system is a coaxial syringe feed system comprising a concentric syringe with center and outer syringe structure for dispensing the at least two CNC solutions.

11. The method according to claim 10, wherein the CNC solutions dispensed by the coaxial syringe feed system comprise immiscible solutions injected simultaneously for fabricating patterned CNC nanofibers having a concentric multi-layer fiber cross section.

12. A method for fabricating patterned cellulose nanocrystal (CNC) nanofibers, comprising the steps of:
    creating a CNC preform of a concentric layer composite;
    reheating the CNC preform to a glass transition temperature; and
    stretching the reheated CNC preform into a strand of patterned CNC nanofibers by a fiber drawing method using an electrospinning process in a fiber extruder electrospinning system.

13. The method according to claim 12, wherein an antigen is coated to an outer surface of the strand of patterned CNC nanofibers with a dip coating process during the electrospinning process for fabricating a biosensor.

14. The method according to claim 13, wherein the biosensor is for detecting *E. coli*.

15. The method according to claim 13, wherein the dip coating process includes the steps of:
- immersing the strand of patterned CNC nanofibers vertically into a solution of the antigen at a constant speed;
- keeping the strand of patterned CNC nanofibers in the solution of the antigen for a period of time to deposit the antigen on the outer surface of the strand of patterned CNC nanofiber; and
- withdrawing the strand of patterned CNC nanofibers coated with the antigen from the solution of the antigen at a constant speed.

16. The method according to claim 12, wherein the fiber extruder electrospinning system comprises a diameter variable extrusion system for fabricating the strand of patterned CNC nanofibers having fused and spliced tapered ends directly fused to a light source and a detector.

17. The method according to claim 12, wherein the strand of patterned CNC nanofibers is periodically tapered in an axial direction for fabricating a distributive biosensor for detecting viruses at different regions of the distributive biosensor.

18. The method according to claim 12, wherein the fiber extruder electro spinning system comprises a diameter variable extrusion system for fabricating the strand of patterned CNC nanofibers having regions of different diameters.

19. The method according to claim 18, wherein the regions of different diameters of the strand of patterned CNC nanofibers are coated with different antigens for fabricating a multi-virus biosensor.

20. The method according to claim 12, wherein the strand of patterned CNC nanofibers is coated with different antigens at different locations of the strand of patterned CNC nanofibers for fabricating a biosensor for monitoring different viruses at different locations.

* * * * *